United States Patent
Lu et al.

(10) Patent No.: US 7,079,928 B2
(45) Date of Patent: Jul. 18, 2006

(54) SYSTEM AND METHOD FOR DETERMINING A WHEEL DEPARTURE ANGLE FOR A ROLLOVER CONTROL SYSTEM WITH RESPECT TO ROAD ROLL RATE AND LOADING MISALIGNMENT

(75) Inventors: Jianbo Lu, Livonia, MI (US); Todd Allen Brown, Dearborn, MI (US); Erik C. Chubb, Hazel Park, MI (US); Albert Chenouda Salib, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 10/776,774

(22) Filed: Feb. 11, 2004

(65) Prior Publication Data

US 2004/0162654 A1    Aug. 19, 2004

Related U.S. Application Data

(63) Continuation-in-part of application No. 10/610,278, filed on Jun. 30, 2003.

(60) Provisional application No. 60/487,716, filed on Jul. 16, 2003, provisional application No. 60/400,376, filed on Aug. 1, 2002, provisional application No. 60/400,375, filed on Aug. 1, 2002, provisional application No. 60/400,172, filed on Aug. 1, 2002, provisional application No. 60/400,261, filed on Aug. 1, 2002.

(51) Int. Cl.
*G01C 9/10* (2006.01)
*B60T 8/24* (2006.01)

(52) U.S. Cl. .................... 701/38; 701/36; 280/735

(58) Field of Classification Search ............ 701/38, 701/36, 37; 280/735, 5.515, 6.159, 5.505, 280/5.507, 5.508, 5.513, 5.51, 5.512; 180/197, 180/282

See application file for complete search history.

(56) References Cited

U.S. PATENT DOCUMENTS 2,917,126 A    12/1959   Phillips (Continued)

FOREIGN PATENT DOCUMENTS

DE    36 16 907    11/1987

(Continued)

OTHER PUBLICATIONS

A method for reducing on-road rollovers—anti-rollover braking, Thomas J. Wielenga, Dynamotive, LLC, International Congress and Expositon, Detroit, Michigan, Mar. 1-4, 1999.

(Continued)

*Primary Examiner*—Dalena Tran
(74) *Attorney, Agent, or Firm*—Artz & Artz, P.C.; Gary A. Smith

(57) ABSTRACT

A control system (18) and method for an automotive vehicle includes a roll rate sensor (34) generating a roll rate signal, a lateral acceleration sensor (32) generating a lateral acceleration signal, a pitch rate sensor (37) generating a pitch rate signal, a yaw rate sensor (28) generating a yaw rate signal and a controller (26). The controller (26) is coupled to the roll rate sensor (34), the lateral acceleration sensor, the yaw rate sensor and the pitch rate sensor. The controller (26) determines a roll velocity total from the roll rate signal, the yaw rate signal and the pitch rate signal. The controller (26) also determines a relative roll angle from the roll rate signal and the lateral acceleration signal. The controller (26) determines a wheel departure angle from the total roll velocity. The controller (26) determines a calculated roll signal from the wheel departure angle and the relative roll angle signal.

30 Claims, 9 Drawing Sheets

U.S. PATENT DOCUMENTS

| | | |
|---|---|---|
| 3,604,273 A | 9/1971 | Kwok et al. |
| 3,608,925 A | 9/1971 | Murphy |
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,597,462 A | 7/1986 | Sano et al. |
| 4,650,212 A | 3/1987 | Yoshimura |
| 4,679,808 A | 7/1987 | Ito et al. |
| 4,690,553 A | 9/1987 | Fukamizu et al. |
| 4,696,489 A * | 9/1987 | Fujishiro et al. ......... 280/5.519 |
| 4,712,807 A * | 12/1987 | Kurosawa ................ 280/5.508 |
| 4,761,022 A | 8/1988 | Ohashi et al. |
| 4,765,649 A | 8/1988 | Ikemoto et al. |
| 4,767,588 A | 8/1988 | Ito |
| 4,778,773 A | 10/1988 | Sukegawa |
| 4,797,825 A * | 1/1989 | Ikemoto et al. ................ 701/38 |
| 4,809,183 A | 2/1989 | Eckert |
| 4,827,416 A | 5/1989 | Kawagoe et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,262 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,085,458 A * | 2/1992 | Kii et al. ................ 280/5.506 |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,278,761 A | 1/1994 | Ander et al. |
| 5,282,134 A | 1/1994 | Gioutsos et al. |
| 5,311,431 A | 5/1994 | Cao et al. |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,446,658 A | 8/1995 | Pastor et al. |
| 5,510,989 A | 4/1996 | Zabler et al. |
| 5,548,536 A | 8/1996 | Ammon |
| 5,549,328 A | 8/1996 | Cubalchini |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,935,181 A * | 8/1999 | Iwasaki ....................... 701/37 |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffmann |
| 6,002,975 A | 12/1999 | Schiffmann et al. |
| 6,017,044 A * | 1/2000 | Kawagoe ............. 280/124.106 |
| 6,023,220 A * | 2/2000 | Dobler et al. ................ 340/440 |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A * | 5/2000 | Wielenga .................... 180/282 |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida et al. |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |

| | | | | | | |
|---|---|---|---|---|---|---|
| 6,226,579 B1 | 5/2001 | Hackl et al. | | DE | 43 21 571 | 1/1994 |
| 6,233,510 B1 | 5/2001 | Platner et al. | | DE | 42 27 886 | 2/1994 |
| 6,263,261 B1 | 7/2001 | Brown et al. | | DE | 43 35 979 | 4/1995 |
| 6,266,596 B1 | 7/2001 | Hartman et al. | | DE | 43 42 732 | 6/1995 |
| 6,272,420 B1 | 8/2001 | Schramm et al. | | DE | 199 07 633 | 10/1999 |
| 6,278,930 B1 | 8/2001 | Yamada et al. | | EP | 0 430 813 | 12/1993 |
| 6,282,471 B1 | 8/2001 | Burdock et al. | | EP | 0 662 601 | 7/1995 |
| 6,282,472 B1 | 8/2001 | Jones et al. | | EP | 0 758 601 | 2/1997 |
| 6,282,474 B1 | 8/2001 | Chou et al. | | FR | 24 25 342 | 12/1979 |
| 6,292,734 B1 | 9/2001 | Murakami et al. | | GB | 2257403 | 1/1993 |
| 6,292,759 B1 | 9/2001 | Schiffmann | | GB | 2 342 078 | 4/2000 |
| 6,311,111 B1 | 10/2001 | Leimbach et al. | | JP | 62055211 | 9/1985 |
| 6,314,329 B1 | 11/2001 | Madau et al. | | JP | 63116918 | 5/1988 |
| 6,315,373 B1 | 11/2001 | Yamada et al. | | JP | 63151539 | 6/1988 |
| 6,321,141 B1 | 11/2001 | Leimbach | | JP | 63203456 | 8/1988 |
| 6,324,446 B1 | 11/2001 | Brown et al. | | JP | 1101238 | 4/1989 |
| 6,324,458 B1 | 11/2001 | Takagi et al. | | JP | 2171373 | 7/1990 |
| 6,330,522 B1 | 12/2001 | Takeuchi | | JP | 3042360 | 2/1991 |
| 6,332,104 B1 | 12/2001 | Brown et al. | | JP | 3045452 | 2/1991 |
| 6,338,012 B1 | 1/2002 | Brown et al. | | JP | 4008837 | 1/1992 |
| 6,349,247 B1 | 2/2002 | Schramm et al. | | JP | 5016699 | 1/1993 |
| 6,351,694 B1 | 2/2002 | Tseng et al. | | JP | 5254406 | 10/1993 |
| 6,352,318 B1 | 3/2002 | Hosomi et al. | | JP | 6278586 | 10/1994 |
| 6,356,188 B1 | 3/2002 | Meyers et al. | | JP | 6297985 | 10/1994 |
| 6,370,938 B1 | 4/2002 | Leimbach et al. | | JP | 6312612 | 11/1994 |
| 6,394,240 B1 | 5/2002 | Barwick | | JP | 8080825 | 3/1996 |
| 6,397,127 B1 | 5/2002 | Meyers et al. | | JP | 9005352 | 1/1997 |
| 6,419,240 B1 | 7/2002 | Burdock et al. | | JP | 10024819 | 1/1998 |
| 6,428,118 B1 | 8/2002 | Blosch | | JP | 10329682 | 12/1998 |
| 6,438,464 B1 | 8/2002 | Woywod et al. | | JP | 11011272 | 1/1999 |
| 6,477,480 B1 | 11/2002 | Tseng et al. | | JP | 11170992 | 6/1999 |
| 6,496,758 B1 | 12/2002 | Rhode et al. | | JP | 11254992 | 9/1999 |
| 6,496,763 B1 | 12/2002 | Griessbach | | JP | 11255093 | 9/1999 |
| 6,498,976 B1 | 12/2002 | Ehlbeck et al. | | JP | 11304663 | 10/1999 |
| 6,529,803 B1 | 3/2003 | Meyers et al. | | JP | 11304662 | 11/1999 |
| 6,529,811 B1 * | 3/2003 | Watson et al. ........... 701/45 | | SU | 816849 | 3/1981 |
| 6,547,022 B1 | 4/2003 | Hosomi et al. | | | | |
| 6,554,293 B1 | 4/2003 | Fennel et al. | | | | |
| 6,556,908 B1 | 4/2003 | Lu et al. | | | | |
| 6,559,634 B1 | 5/2003 | Yamada | | | | |
| 6,618,656 B1 | 9/2003 | Kueblbeck et al. | | | | |
| 6,766,875 B1 * | 7/2004 | Yamamoto ........... 180/282 | | | | |
| 2002/0014799 A1 | 2/2002 | Nagae | | | | |
| 2002/0040268 A1 | 4/2002 | Yamada et al. | | | | |
| 2002/0056582 A1 | 5/2002 | Chubb | | | | |
| 2002/0075139 A1 | 6/2002 | Yamamoto et al. | | | | |
| 2002/0096003 A1 | 7/2002 | Yamada et al. | | | | |
| 2002/0139599 A1 | 10/2002 | Lu | | | | |

FOREIGN PATENT DOCUMENTS

| | | |
|---|---|---|
| DE | 38 15 938 | 11/1989 |

OTHER PUBLICATIONS

Eger, R., Majjad, R., Naser, N., "Rollover simulation based on a nonlinear model", SAE 98020.

Nalecz, A.G., Bindermann, A.C., Brewer H.K., "Dynamic analysis of vehicle rollover", 12th International Conference on Experimental Safety Vehicles, Goteborg, Sweeden, May 29-June 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

* cited by examiner

SYSTEM AND METHOD FOR DETERMINING A WHEEL DEPARTURE ANGLE FOR A ROLLOVER CONTROL SYSTEM WITH RESPECT TO ROAD ROLL RATE AND LOADING MISALIGNMENT

RELATED APPLICATIONS

The present invention claims priority to provisional application 60/487,716 filed on Jul. 16, 2003, and is a continuation-in-part to U.S. application Ser. No. 10/610,278, filed Jun. 30, 2003 which claims priority to U.S. provisional applications 60/400,376, 60/400,375, 60/400,172, and 60/400,261, filed Aug. 1, 2002, the disclosures of which are incorporated by reference herein. The present invention is also related to U.S. application Ser. No. 10/610,280 filed Jun. 30, 2003 entitled "SYSTEM AND METHOD FOR CHARACTERIZING THE ROAD BANK FOR VEHICLE ROLL STABILITY CONTROL", and Ser. No. 10/610,279 filed Jun. 30, 2003 entitled "SYSTEM AND METHOD FOR CHARACTERIZING VEHICLE BODY TO ROAD ANGLE FOR VEHICLE ROLL STABILITY CONTROL".

TECHNICAL FIELD

The present invention relates generally to a control apparatus for controlling a system of an automotive vehicle in response to sensed dynamic behavior, and more specifically, to a method and apparatus for controlling the roll characteristics of the vehicle by characterizing the wheel departure angle on which the vehicle is having a potential rollover event.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle roll stability control it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

There are two types of vehicle attitudes needed to be distinguished. One is the so-called global attitude, which is sensed by the angular rate sensors. The other is the relative attitude, which measures the relative angular positions of the vehicle with respect to the road surface on which the vehicle is driven. The global attitude of the vehicle is relative to an earth frame (or called the inertia frame), sea level, or a flat road. It can be directly related to the three angular rate gyro sensors. While the relative attitude of the vehicle measures the relative angular positions of the vehicle with respect to the road surface, which are always of various terrains. Unlike the global attitude, there are no gyro-type sensors that can be directly related to the relative attitude. A reasonable estimate is that a successful relative attitude sensing system utilizes both the gyro-type sensors (when the road becomes flat, the relative attitude sensing system recovers the global attitude) and some other sensor signals.

One reason to distinguish relative and global attitude is due to the fact that vehicles are usually driven on a three-dimensional road surface of different terrains, not always on a flat road surface. Driving on a road surface with a large road bank does increase the rollover tendency, i.e., a large output from the global attitude sensing system might well imply an uncontrollable rollover event regardless of the flat road driving and the 3-D road driving. However driving on a three-dimensional road with moderate road bank angle, the global attitude may not be able to provide enough fidelity for a rollover event to be distinguished. Vehicular rollover happens when one side of the vehicle is lifted from the road surface with a long duration of time without returning back. If a vehicle is driven on a banked road, the global attitude sensing system will pick up certain attitude information even when the vehicle does not experience any wheel lifting (four wheels are always contacting the road surface). Hence a measure of the relative angular positions of the vehicle with respect to the portion of the road surface on which the vehicle is driven provides more fidelity than global attitude to sense the rollover event when the vehicle is driven on a road with a moderate bank angle. Such an angle is called body-to-road roll angle and it is used as one of the key variables in the roll stability control module to compute the amount of actuation needed for preventing untripped rollover event.

When the vehicle does not have one side lifted, U.S. Pat. No. 6,556,908 does provide a method to calculate the relative attitudes and their accuracy may be affected by the vehicle loading, suspension and tire conditions. However, during a potential rollover event, such a relative roll angle is not a good measure of the true relative roll angle between vehicle body and the road surface. U.S. patent application Ser. No. 10/459,697 filed Jun. 11, 2003 provides another way to compute the true relative roll angle during a potential rollover event. This application is suited for cases where vehicle loading and suspension conditions are very close to the nominal systems. If the vehicle has large loading variations (especially roof loading), potential inaccuracy could cause false activations in roll stability controls.

During a potential rollover event, one or two wheels on the inside of the vehicle turn are up in the air and there is an angle between the axle of the lifted wheel and road surface. Such an angle is called a wheel departure angle. If such a wheel departure can be somehow characterized, the true body-to-road roll angle can be conceptually obtained as the sum of the wheel departure angle and the relative roll angle calculated in U.S. Pat. No. 6,556,908.

Another way to capture the true body-to-road roll angle is to use the resultant angle obtained by subtracting the road bank angle for the global roll angle calculated for example in U.S. Pat. No. 6,631,317, issued Oct. 7, 2003. Although this method is theoretically feasible, it has inevitable drawbacks. The first drawback lies in the computation of the road bank angle, since there is no robust and accurate computation of road banks using the existing sensor set. Secondly, the global roll angle computation as shown in U.S. Pat. No. 6,631,317 may be affected by the accuracy of the low frequency bank angle estimation.

Therefore, the aforementioned two methods of computing the body-to-road roll angle may not deliver accurate enough body-to-road roll angle for roll stability control purpose in certain situations. Because each of the individual methods described above does provide accurate measure within certain conditions, a sensor fusion algorithm would be a way to obtain an angle good for roll stability control. Such a sensor fusion method needs to integrate the various angles and conduct signal sensitizing and desensitizing, which may include the computations of (i) global roll angle as discussed in U.S. Pat. No. 6,631,317; (ii) relative roll angle as discussed in U.S. Pat. No. 6,556,908; (iii) a rough characterization of the road bank angle, which is called a reference road bank angle; (iv) wheel departure angle; (v) body-to-road roll angle; (vi) transition and rollover condition.

By subtracting the wheel departure angle and the relative angle from the global roll angle, a road bank angle with better accuracy than reference road bank angle is obtained. Such road bank angle is not only needed for roll stability control, but also for other applications. For example, the road bank angle could be used in an active anti-roll-bar control, the yaw stability control, etc., to set threshold values for various control variables. An active roll control system using a controlled anti-roll-bar does not respond suitably to the side bank in the conventional setting, since the presence of road side bank cannot be detected and the system therefore responds to a side bank as if the vehicle were cornering. This can result in unnecessary power consumption for the active anti-roll-bar system. In order to eliminate this, U.S. Pat. No. 6,282,471 provides a very crude estimation of the road bank using lateral acceleration sensor and vehicle reference speed. A vehicle driven on a road with a sharp bank may cause false activation for the yaw stability control system and/or roll stability control system due to the fact that large lateral motion is determined through sensor signals and the sensor signals (for example, the lateral acceleration) may be contaminated by the gravity component due to road bank. That is, the sensor signals might indicate a large lateral vehicle motion even if the vehicle is driven in steady state condition on the banked road.

Therefore, it is desirable in vehicle dynamics control, especially for roll stability control to detect accurately a wheel departure angle so as to accurately predict the true roll position of the vehicle with respect the road surface to properly activate the vehicle control systems. It is also desirable to use wheel departure angle information together with other useful information to identify various information good for setting control thresholds.

SUMMARY

Because each of the individual methods described above does provide accurate measure with certain conditions, a sensor fusion algorithm would be a way to obtain an angle good for roll stability control. Such a sensor fusion method needs to integrate the various angles and conduct signal sensitizing and desensitizing, which may include the computations of (i) global roll angle as discussed in U.S. Pat. No. 6,631,317; (ii) relative roll angle as discussed in U.S. Pat. No. 6,556,908; (iii) a rough characterization of the road bank angle (which is called a reference road bank angle); (iv) wheel departure angle; (v) body-to-road roll angle; (vi) transition and rollover condition.

In one embodiment, a control system for an automotive vehicle includes a roll rate sensor generating a roll rate signal, a lateral acceleration sensor generating a lateral acceleration signal, a longitudinal acceleration sensor generating a longitudinal acceleration, a yaw rate sensor generating a yaw rate signal and a controller. The controller is coupled to the roll rate sensor, the lateral acceleration sensor, the yaw rate sensor and the longitudinal acceleration sensor. The controller determines a total roll velocity from the roll rate signal, the yaw rate signal and a calculated pitch angle signal. The calculated pitch angle is a function of the static pitch angle plus the dynamic pitch angle called a relative pitch angle, which is a function of the longitudinal acceleration. The controller also determines a relative roll angle from the roll rate signal and the lateral acceleration signal. The controller determines a wheel departure angle from the total roll velocity. The controller determines a calculated roll signal used for roll stability control from the wheel departure angle and the relative roll angle signal. The relative roll angle signal may be further blended with the other computations such as reference bank angle, global roll angle, vehicle rollover condition and transitional condition.

In another embodiment, a method of controlling an automotive vehicle comprises determining a total roll angle velocity, determining a wheel departure angle in response to a total roll angle velocity, and controlling the vehicle in response to the wheel departure angle.

One advantage of the invention is that the sensors and signals available in a roll stability control system are used to determine the wheel departure angle. Further, the processing involved in the wheel departure angle uses little processing resources. Another advantage is the wheel which may be set to extend beyond the actual time the wheels are lifted to account for processing delays (sensitizing) during wheel lifting and to reset the wheel departure angle to zero (desensitizing) during wheel grounding.

Other advantages and features of the present invention will become apparent when viewed in light of the detailed description of the preferred embodiment when taken in conjunction with the attached drawings and appended claims.

DETAILED DESCRIPTION

Figure 1:
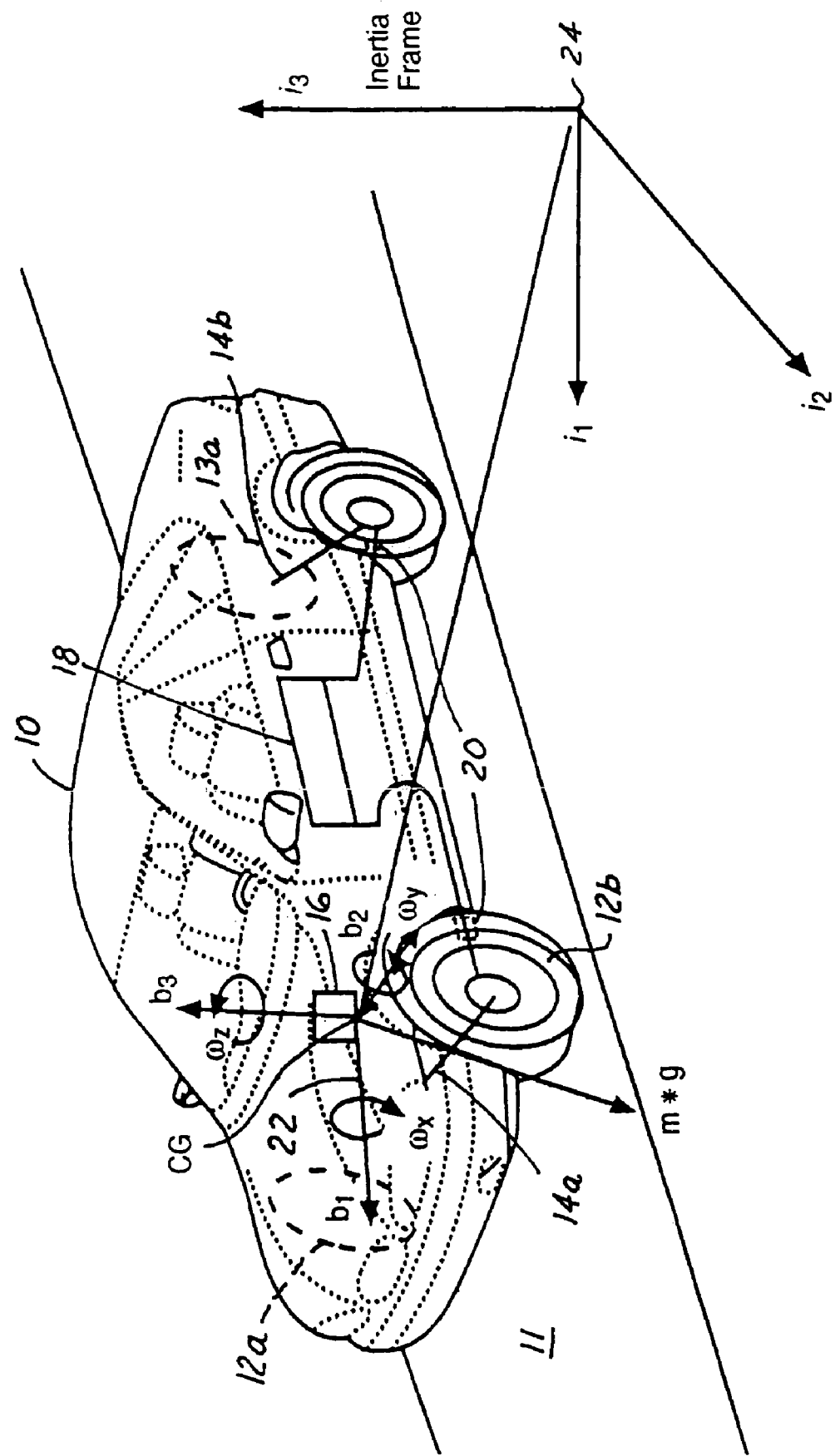
FIG. 1 is a diagrammatic view of a vehicle with variable vectors and coordinator frames.

In the following figures the same reference numerals will be used to identify the same components. The present teachings may be used in conjunction with a yaw control system or a rollover control system for an automotive vehicle. However, the present teachings may also be used with a deployment device such as airbag or roll bar.

Referring to FIG. 1, an automotive vehicle 10 on a road surface 11 with a safety system is illustrated with the various forces and moments thereon. Vehicle 10 has front right and front left tires 12a and 12b and rear right tires and rear left tires 13a and 13b, respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is part of a control system 18. The sensing system 16 may use a standard yaw stability control sensor set (including lateral acceleration sensor, yaw rate sensor, steering angle sensor and wheel speed sensor) together with a roll rate sensor and a longitudinal acceleration sensor. The various sensors will be further described below. The wheel speed sensors 20 are mounted at each corner of the vehicle, and the rest of the sensors of sensing system 16 may be mounted directly on the center of gravity of the vehicle body, along the directions x, y and z shown in FIG. 1. As those skilled in the art will recognize, the frame from $b_1$ $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. $b_1$, $b_2$ and $b_3$ are interchangeable with $x_b$, $y_b$ and $z_b$ in this invention disclosure. The angular rates of the car body are denoted about their respective axes as $\omega_x$ for the roll rate, $\omega_y$ for the pitch rate and $\omega_z$ for the yaw rate. If in case the vehicle sensor frames are different from the vehicle body-fixed frames, a sensor frame directions of $x_s$, $y_s$ and $z_s$ will be used. In this case, the angular rate variables measured in the body frames will be denoted as $\omega_{bx}$, $\omega_{by}$ and $\omega_{bz}$ and the angular rate variables measured in the sensor frame will be denoted as $\omega_{sx}$, $\omega_{sy}$ and $\omega_{sz}$. The calculations set forth herein may take place in an inertial frame 24 that may be derived from the body frame 22 as described below.

The angular rate sensors and the acceleration sensors are mounted on the vehicle car body along the body frame directions $b_1$, $b_2$ and $b_3$, which are the x-y-z axes of the vehicle's sprung mass. If in case the vehicle sensor frames are different from the vehicle body-fixed frames, the angular rate sensors and the acceleration sensors are mounted on the vehicle car body along the sensor frame directions $x_s$, $y_s$ and $z_s$. The longitudinal acceleration sensor 36 is mounted on the car body located at the center of gravity, with its sensing direction along $b_1$-axis, whose output is denoted as $a_x$. The lateral acceleration sensor 32 is mounted on the car body located at the center of gravity, with its sensing direction along $b_2$-axis, whose output is denoted as $a_y$. If in case the vehicle sensor frames are different from the vehicle body-fixed frames, the accelerations along the sensor frames will be denoted as $a_{sx}$, $a_{sy}$ and $a_{sz}$, and the accelerations along the body frames will be denoted as $a_{bx}$, $a_{by}$ and $a_{bz}$.

The other frame used in the following discussion includes the road frame, as depicted in FIG. 1. The road frame system $r_1r_2r_3$ is fixed on the driven road surface, where the $r_3$ axis is along the average road normal direction computed from the normal directions of the four-tire/road contact patches.

In the following discussion, the Euler angles of the body frame $b_1b_2b_3$ with respect to the road frame $r_1r_2r_3$ are denoted as $\theta_{xr},\theta_{yr}$ and $\theta_{zr}$, which are also called the relative Euler angles. If in case the vehicle sensor frames are different from the vehicle body-fixed frames, the calculated $\theta_{xr},\theta_{yr}$ using the senor frame signals are the same as the calculated $\theta_{xr},\theta_{yr}$ using the body frame signals due to the fact that $\theta_{xr},\theta_{yr}$ reflect the dynamic portion of relative attitudes which are not affected by the constant misalignment angles between the sensor frames and the body frames.

Figure 2:
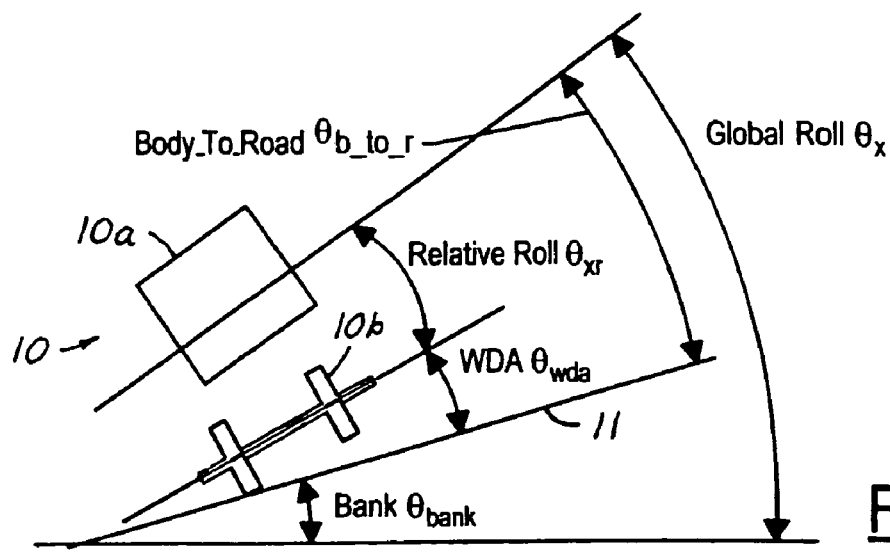
FIG. 2 is an end view of an automotive vehicle on a bank with definitions of various angles including global roll angle, relative roll angle, wheel departure angle (WDA), road bank angle and body-to-road angle.
Figure 9:
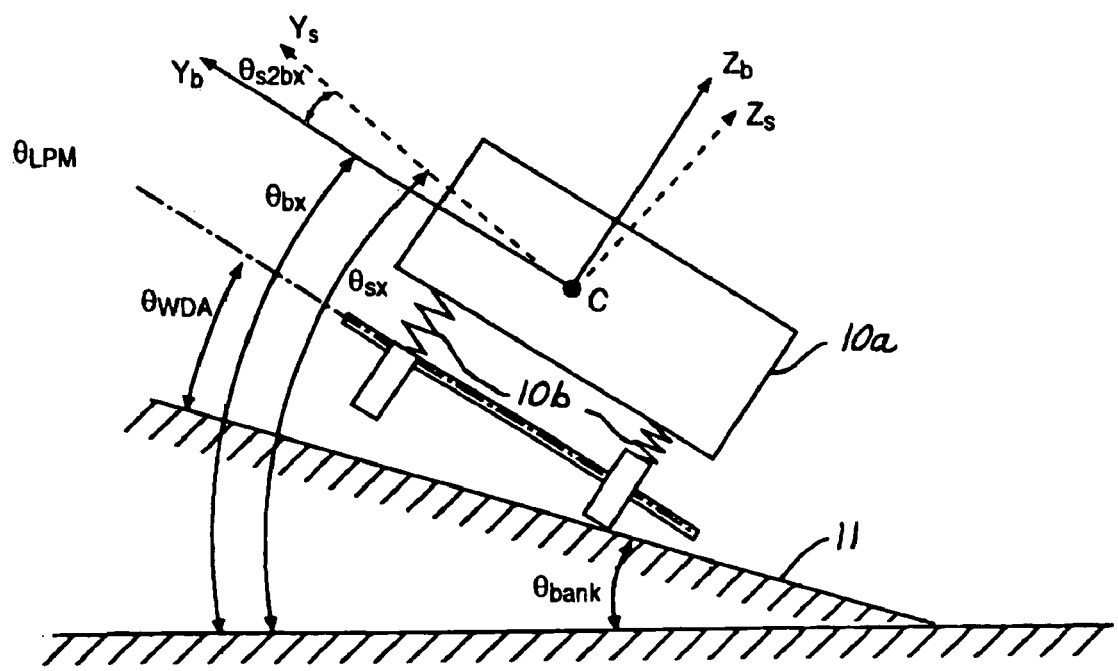
FIG. 9 is an end view of a vehicle driven on a banked road during a potential rollover event. The roll angles of the sensor frame and body-fixed frame are both shown here.
Figure 10:
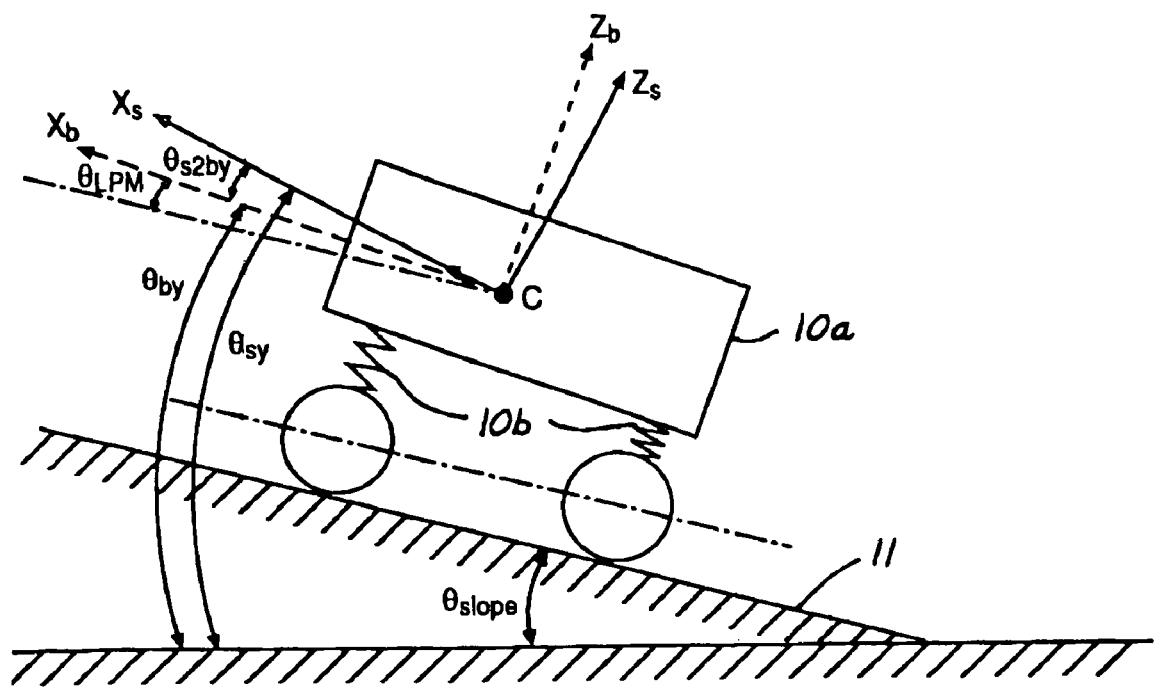
FIG. 10 is a side view of a vehicle with different pitch misalignments.
Figure 11:
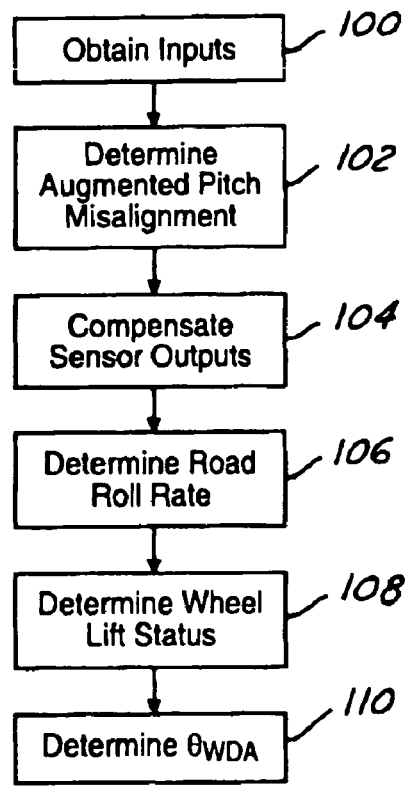
FIG. 11 is flow chart of the operation of one embodiment of the present invention.

Referring now to FIG. 2, the relationship of the various angles of the vehicle 10 relative to the road surface 11 is illustrated. The present teaching determines a wheel departure angle $\theta_{wda}$, which is the angle from the axle or the wheel axis to the road surface 11. Also shown is a reference road bank angle $\theta_{bank}$ which is shown relative to the vehicle 10 on a road surface. The vehicle 10 has a vehicle body 10a and vehicle suspension 10b. The relative roll angle $\theta_{xr}$ is the angle between the wheel axle and the body 10a. The global roll angle $\theta_x$ is the angle between the horizontal plane (e.g., at sea level) and the vehicle body 10a. If the sensor frames are different from the body frames, the misalignment angles between the body frames and the sensor frames will be inserted in to the above plot. Such misalignment angles will be used in the second part of this invention and they are depicted in FIGS. 9 and 10.

Figure 3A:
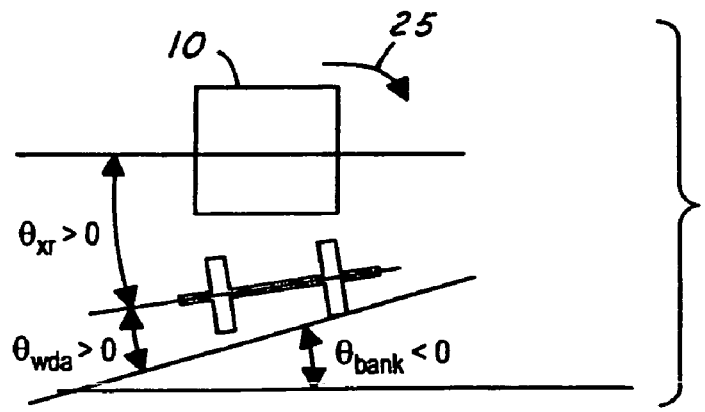
FIG. 3A is an end view of an on-camber divergent vehicle tendency.

Referring now to FIG. 3A, vehicle 10 is illustrated in an on-camber divergent state. The on-camber divergent state refers to the vehicle having a greater than 0 wheel departure angle, a greater than 0 relative roll angle, and a moment represented by arrow 25 tending to increase the relative roll angle and the wheel departure angle. In this example, the bank angle is less than 0.

Figure 3B:
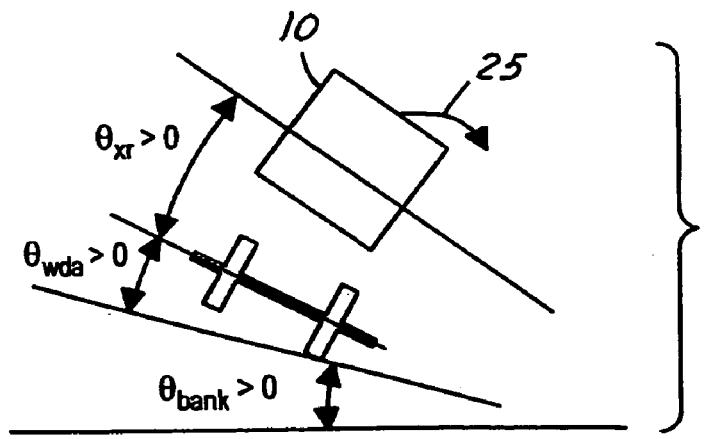
FIG. 3B is an end view of an automotive vehicle in an off-camber divergent condition.

In FIG. 3B, when the bank angle is greater than 0, the wheel departure angle is greater than 0, the relative roll angle is greater than 0 and the moment is also to the right or increasing the relative roll angle and the wheel departure angle, the vehicle is in an off-camber divergent state.

Figure 3C:
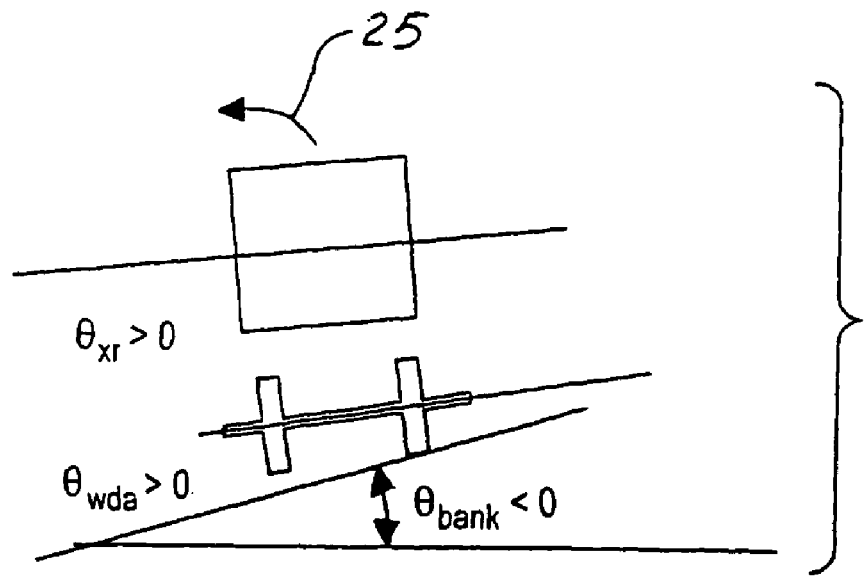
FIG. 3C is an end view of a vehicle in an on-camber convergent condition.

Referring now to FIG. 3C, a bank angle of less than 0, a wheel departure angle greater than 0, and a relative roll angle greater than 0 is shown with a roll moment 25 acting to the left. Thus, the vehicle is in an on-camber convergent state. That is, the convergent state refers to the vehicle tending towards not overturning.

Figure 3D:
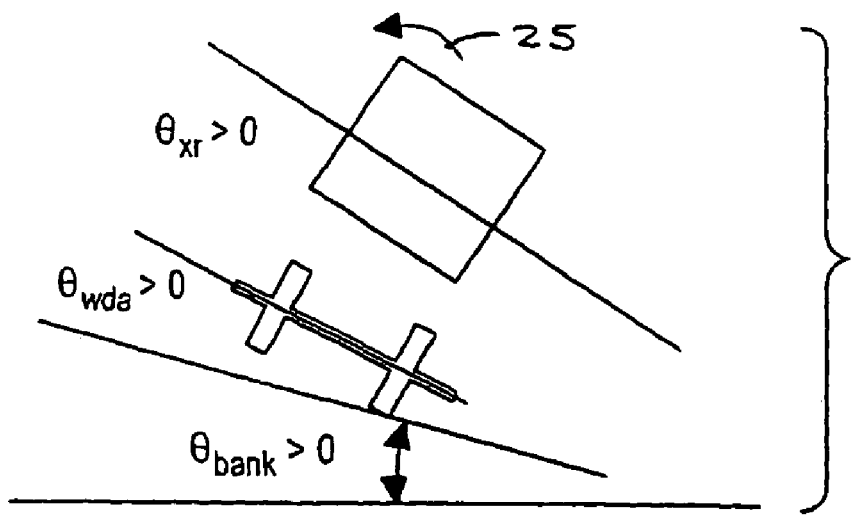
FIG. 3D is an end view of a vehicle in an off-camber convergent condition.

Referring now to FIG. 3D, when the bank angle is greater than 0, the wheel departure angle is greater than 0, and the relative roll angle is greater than 0 and the roll moment is tending to the left, the vehicle is in an off-camber convergent state. That is, the vehicle is tending toward not rolling over.

Figure 4A:
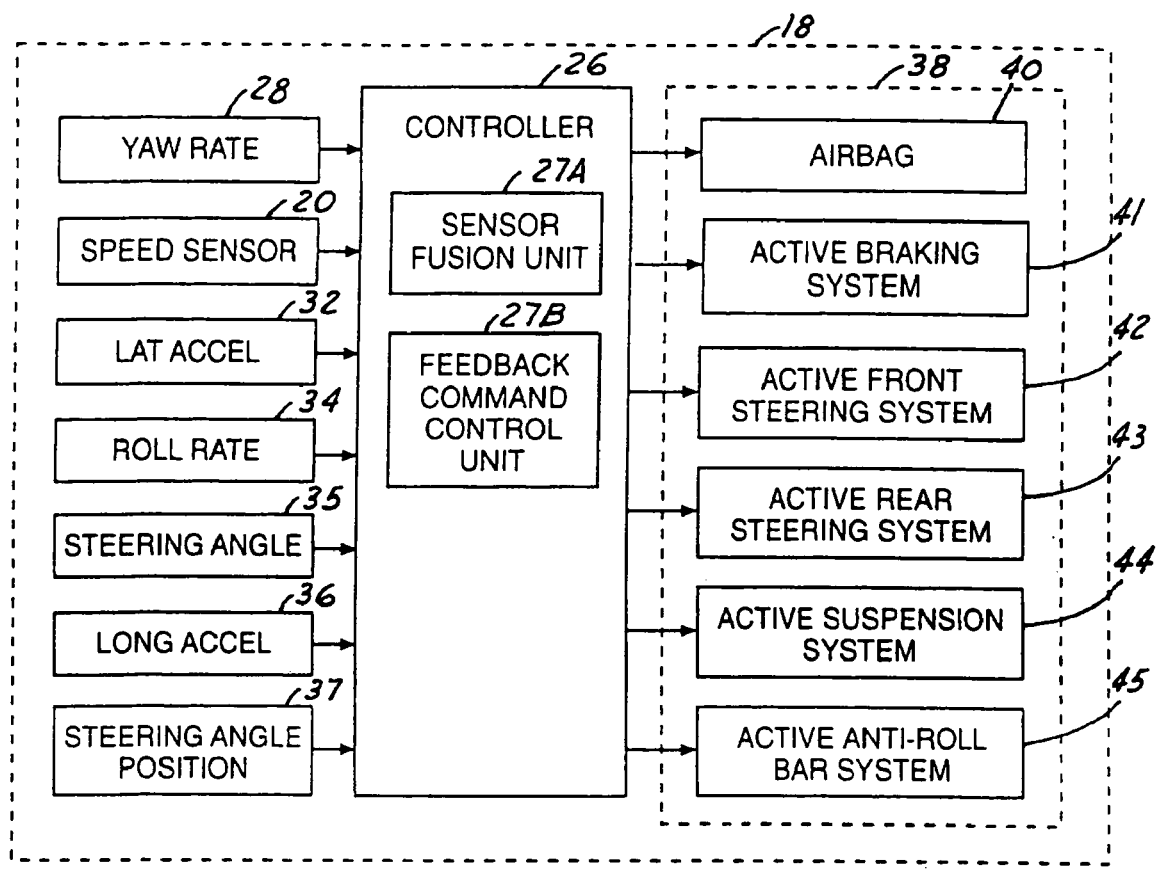
FIG. 4A is a block diagram of a stability control system.

Referring now to FIG. 4A, one embodiment of a roll stability control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor (hand wheel position) 35, a longitudinal acceleration sensor 36, and steering angle position sensor 37.

In one embodiment, the sensors are located at the center of gravity of the vehicle. Those skilled in the art will recognize that the sensors may also be located off the center of gravity and translated equivalently thereto. The sensors are mounted along the sensor frames and the sensor frames are different from the vehicle body frames, an Euler transformation can be conducted to transfer the sensor frame signals to body frame signals using the calculated misalignment angles between those two sets of frames.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 20, 28, 32, 34, 35, 36, and 37, or various combinations of the sensors, may be used in a commercial embodiment. Safety device 38 may control an airbag 40, an active braking system 41, an active front steering system 42, an active rear steering system 43, an active suspension system 44, and an active anti-roll bar system 45, or combinations thereof. Each of the systems 40-45 may have their own controllers for activating each one. As mentioned above, the safety system 38 may be at least the active braking system 41.

Roll rate sensor 34 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in active air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 20, 28, 32, 34, 35, 36, 37, controller 26 determines a roll condition and controls any one or more of the safety devices 40-45.

Speed sensor 20 may be one of a variety of speed sensors known to those skilled in the art. For example, a suitable speed sensor 20 may include a sensor at every wheel that is averaged by controller 26. The controller 26 translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

Figure 4B:
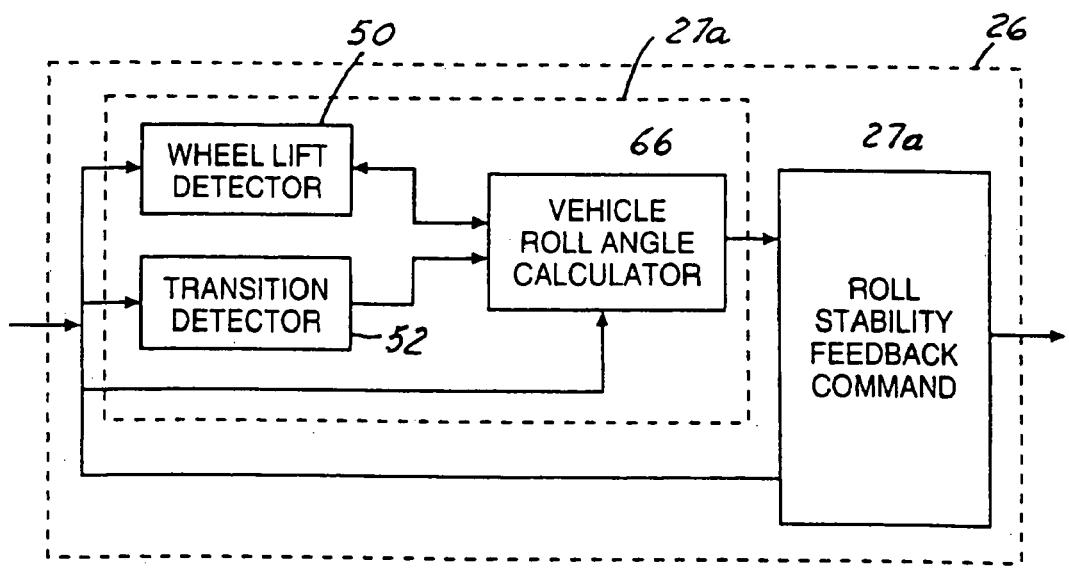
FIG. 4B is a block diagram of the controller 26 used in the stability control system depicted in FIG. 4A.

Referring now to FIGS. 4A and 4B, controller 26 is illustrated in further detail. There are two major functions in controller 26: the rollover trend determination, which is called a sensor fusion unit, 27A and the feedback control command unit 27B. The sensor fusion unit 27A can be further decomposed as a wheel lift detector 50, a transition detector 52 and a vehicle roll angle calculator 66.

Figure 5:
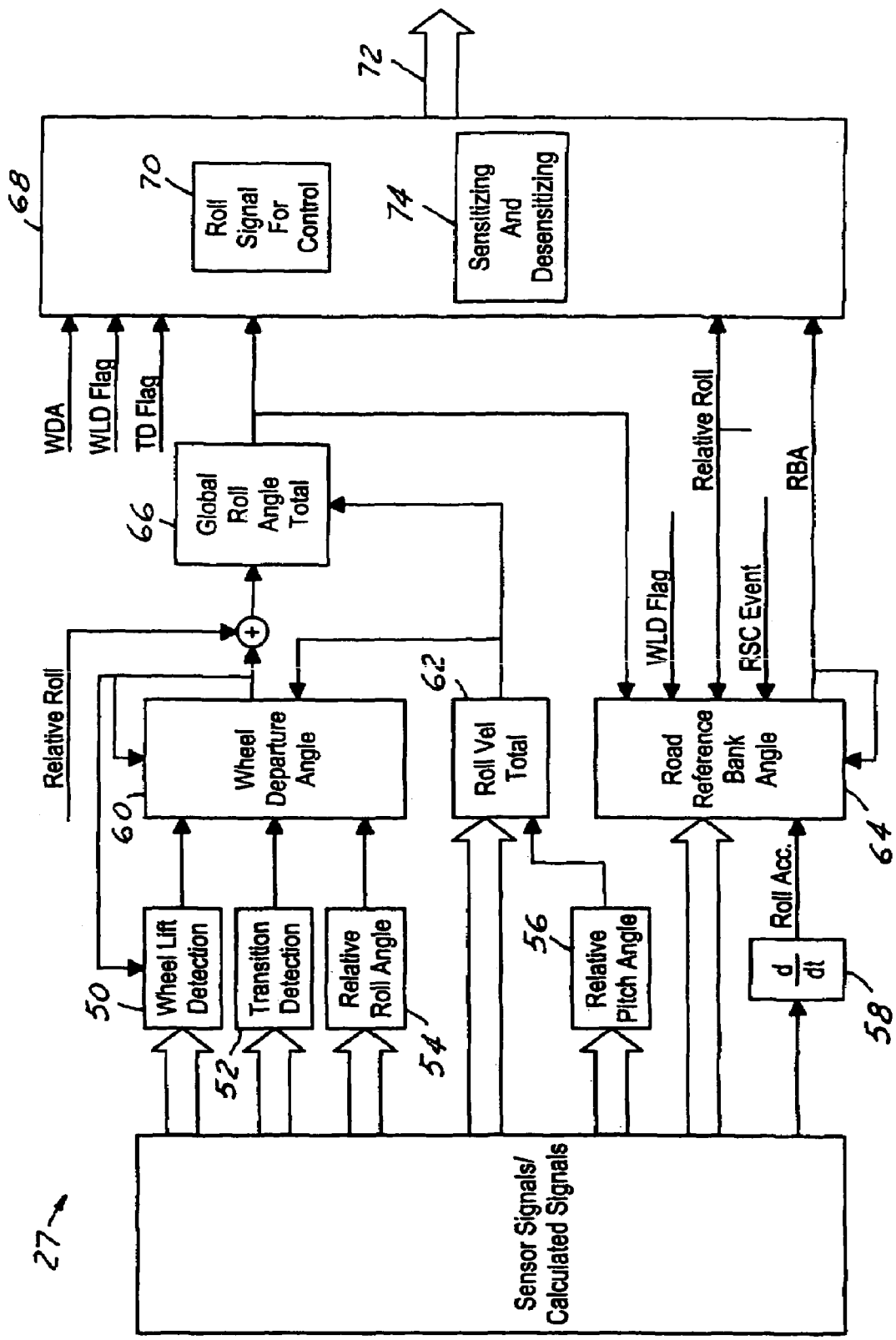
FIG. 5 is a block diagrammatic view of the unit 27 depicted in FIG. 4B, which is used for quantitatively and qualitatively determining rollover trend of a vehicle.

Referring now to FIG. 5, the sensor fusion unit 27A is illustrated in further detail. The sensor fusion unit 27A receives the various sensor signals, 20, 28, 32, 34, 35, 36, 37 and integrates all the sensor signals with the calculated signals to generate signals suitable for roll stability control algorithms. From the various sensor signals wheel lift detection may be determined by the wheel lift detector 50. Wheel lift detector 50 includes both active wheel lift detection and active wheel lift detection, and wheel grounding condition detection. Wheel lift detector is described in co-pending U.S. provisional application Ser. No. 60/400,375 filed Aug. 1, 2002, which is incorporated by reference herein. The modules described below may be implemented in hardware or software in a general purpose computer (microprocessor). From the wheel lift detection module 50, a determination of whether each wheel is absolutely grounded, possibly grounded, possibly lifted, or absolutely lifted may be determined. Transition detection module 52 is used to detect whether the vehicle is experiencing aggressive maneuver due to sudden steering wheel inputs from the driver. The sensors may also be used to determine a relative roll angle in relative roll angle module 54. Relative roll angle may be determined in many ways. One way is to use the roll acceleration module 58 in conjunction with the lateral acceleration sensor. As described above, the relative roll angle may be determined from the roll conditions described above.

The various sensor signals may also be used to determine a relative pitch angle in relative pitch angle module 56 and a roll acceleration in roll acceleration module 58. The outputs of the wheel lift detection module 50, the transition detection module 52, and the relative roll angle module 54 are used to determine a wheel departure angle in wheel departure angle module 60. Various sensor signals and the relative pitch angle in relative pitch angle module 56 are used to determine a relative velocity total in module 62. The road reference bank angle block 64 determines the bank angle. The relative pitch angle, the roll acceleration, and various other sensor signals as described below are used to determine the road reference bank angle. Other inputs may include a roll stability control event (RSC) and/or the presence of a recent yaw stability control event, and the wheel lifting and/or grounding flags.

The global roll angle of the vehicle is determined in global roll angle module 66. The relative roll angle, the wheel departure angle, and the roll velocity total blocks are all inputs to the global roll angle total module 66. The global roll angle total block determines the global roll angle $\theta_x$. An output module 68 receives the global roll angle total module 66 and the road reference bank angle from the road reference bank angle module 64. A roll signal for control is developed in roll signal module 70. The roll signal for control is illustrated as arrow 72. A sensitizing and desensitizing module 74 may also be included in the output module 68 to adjust the roll signal for control.

In the reference road bank angle module 64, the reference bank angle estimate is calculated. The objective of the reference bank estimate is to track a robust but rough indication of the road bank angle experienced during driving in both stable and highly dynamic situations, and which is in favor for roll stability control. That is, this reference bank angle is adjusted based on the vehicle driving condition and the vehicle roll condition. Most importantly, when compared to the global roll estimate, it is intended to capture the occurrence and physical magnitude of a divergent roll condition (two wheel lift) should it occur. This signal is intended to be used as a comparator against the global roll estimate for calculating the error signal which is fed back to roll stability controller 26.

Figure 6:
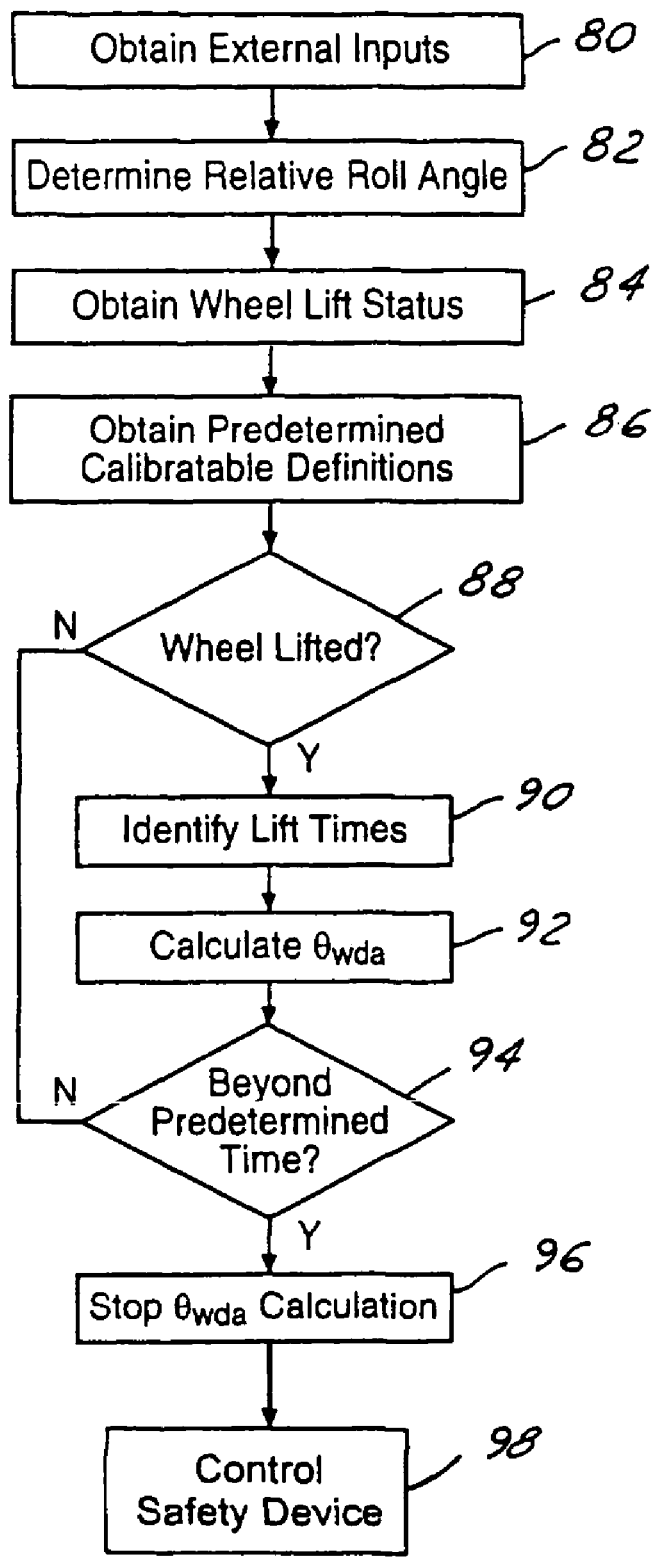
FIG. 6 is flow chart of the operation of one embodiment of the present invention.

Referring now to FIG. 6, the operation of the wheel departure angle block or module 60 is described in further detail. The wheel departure angle, $\theta_{wda}$, between the axle or axis of the wheels and the average road surface is computed. This angle tries to fill the gap left when the relative roll angle is calculated in the relative roll angle module 54. The present embodiment allows a determination of the relative roll angle between the vehicle body and the road surface during a potential rollover event particularly where one or two inside wheels are lifted. This variable is used to boost roll_signal_for_control (the true relative roll angle between the vehicle body and the road surface), which is fed to the output module 68 for computing feedback control command. If this calculated value is less than the actual wheel departure angle, it might reduce the needed control command (under-control); if thus calculated value is greater than the actual wheel departure angle, it might increase the needed control command (over-control).

The external inputs to the wheel departure block 60 are obtained in step 80:

Roll velocity total: $RV_{tot}$, (sometimes written as $\dot{\theta}_x$)
Past value of the wheel departure angle: $\theta_{wda}$
Transition flags: $S_{transition}(0)$ for front left wheel and $S_{transition}(1)$ for front right wheel.
In step 82, the relative roll angle $\theta_{xr}$ is determined.
In step 84 the wheel lift status flags: $S_{wld}(i)$.
If the ith wheel is absolutely grounded, then $S_{wld}(i)$=ABSOLUTELY_GROUNDED
If the ith wheel is in the edge of grounding, $S_{wld}(i)$=POSSIBLY_GROUNDED
If the ith wheel is absolutely lifted, then $S_{wld}(i)$=ABSOLUTELY_LIFTED
If the ith wheel is in the edge of lifting $S_{wld}(i)$=POSSIBLY_LIFTED
If the ith wheel's status cannot be firmly identified, $S_{wld}(i)$=NO_INDICATION
Predefined Calibratable Parameter Definitions are determined in step 86.

Wheel departure angle smoothing ratio: $\rho$, in the present example a value of 1.1 is used.
Relative roll angle threshold for starting wheel departure angle computation during transition maneuver (transition flag is active) pre-charge active: $\Theta_{transition\text{-}active}$
where $\Theta_{transition\text{-}active} = A_{yp} *$ROLL_GRADIENT and $A_{yp}$ reflects the threshold for the percentage of ROLL_GRADIENT, default value 40%.
Relative roll angle threshold for starting wheel departure angle computation during initial wheel lifting: $\Theta_1$
where $\Theta_1 = A_{yb1} *$ROLL_GRADIENT and $A_{yb1}$ reflects the threshold for the percentage of ROLL_GRADIENT. In this example, a value of 75% is used.
Relative roll angle threshold for starting wheel departure angle computation during medium wheel lifting: $\Theta_2$
where $\Theta_2 = A_{yb2} *$ROLL_GRADIENT and $A_{yb2}$ reflects the threshold for the percentage of ROLL_GRADIENT. In this example, a value of 50% is used.
Wheel departure angle threshold for starting wheel departure angle computation during medium wheel lifting: $\Psi_2$
where $\Psi_2 = A_{yw2} *$ROLL_GRADIENT and $A_{yw2}$ reflects the threshold for the percentage of ROLL_GRADIENT. In this example, a value of 25% is used.
Relative roll angle threshold for starting wheel departure angle computation during high wheel lifting: $\Theta_3$
where $\Theta_3 = A_{yb3} *$ROLL_GRADIENT and $A_{yb3}$ reflects the threshold for the percentage of ROLL_GRADIENT. In this example, a value of 40% is used.
Wheel departure angle threshold for starting wheel departure angle computation during high wheel lifting: $\Psi_3$
where $\Psi_3 = A_{yw3} *$ROLL_GRADIENT and $A_{yw3}$ reflects the threshold for the percentage of ROLL_GRADIENT. In this example, a value of 75% is used.
Wheel departure angle filter coefficient: $\alpha$. In this example, a value of 511/512 is used.
Wheel departure angle lower bound: $\Psi_{min}$. In this example, a value of $-10$ degrees is used.
Wheel departure angle upper bound: $\Psi_{max}$. In this example, a value of 10 degrees is used.
A local temporary variable used is the Wheel departure angle intermediate value: $\theta_{wda\text{-}int}$.

When the vehicle is highly lifted on one side (inside in a turn), the relative roll calculated from the relative roll angle module 54 in step 82 may not capture the true relative roll angle between the vehicle body and the road due to lateral acceleration saturation and gravity component in the lateral accelerometer. FIG. 2 shows the angles involved in this case. The relative roll angle $\theta_{xr}$ is the angle due to suspension height variation (also called chassis roll angle or suspension roll angle), which is intended to capture the relative roll between the axle and the vehicle body. The global roll angle $\theta_x$ is the roll angle of the vehicle body with respect to the sea level. The wheel departure angle $\theta_{wda}$ is used to capture the relative roll angle between the axle and the road surface. The road bank angle $\omega_{bank}$ is the relative angle between the road surface and the sea level.

Considering the angles in FIGS. 2 and 3, the following relationship is true:

$$\theta_{wda} = \theta_x - \theta_{xr} - \theta_{bank} \quad (1)$$

Notice that in equation (1) only two variables are known: the total roll angle velocity $\dot{\theta}_x$ ($RV_{tot}$) and the suspension relative roll angle $\theta_{xr}$. Using these known values the wheel departure angle $\theta_{wda}$ is computed.

The roll velocity total $RV_{tot}$ can be computed from roll rate sensor signal, yaw rate sensor signal and the pitch rate sensor signal in the following formula:

$$RV_{tot} = \omega_x + \omega_z(\theta_{yr} + \theta_{yss}) \quad (2)$$

where $\omega_x$ is the roll rate signal, $\omega_z$ is the yaw rate signal and $\theta_y$ is the relative pitch angle and $\theta_{yss}$ is a steady state capture of the pitch angle.

The relative roll angle $\theta_{xr}$ and relative pitch may be determined as set forth in U.S. Pat. No. 6,556,908, which is incorporated by reference herein.

$$\theta_{yr} = \sin^{-1}\{\Theta_{y\text{-}susp}\}$$

$$\theta_{xr} = \sin^{-1}\left\{\frac{\Theta_{x\text{-}susp}}{\cos(\theta_{ybr})}\right\} \quad (3)$$

where $\Theta_{y\text{-}susp}$ and $\Theta_{x\text{-}susp}$ can be calculated as described in the following. Two variables as defined at each sampling instant:

$$RRA\_RAW(k) = \frac{1}{c_1}\dot{\omega}_k(k) - \frac{c_0}{c_1}a_y(k) \quad (4)$$

$$RPA\_RAW(k) = \frac{1}{d_1}\dot{\omega}_y(k) - \frac{d_0}{d_1}a_x(k)$$

where the coefficients $c_0$, $c_1$, $d_0$, $d_1$ can be obtained based on the vehicle parameters (see U.S. Pat. No. 6,556,908 for detail), $\dot{\omega}_y$ is an estimation of the pitch rate signal, which can be calculated as $\dot{\omega}_y = \dot{\theta}_y \sec(\theta_x) + \omega_z \tan(\theta_x)$ if there is an estimatio pitch angle $\theta_y$ is available. Then at the (k+1)th sampling instant (current values), the estimates of $\hat{\Theta}_{x\text{-}susp}(k+1)$ and $\hat{\Theta}_{y\text{-}susp}(k+1)$ may be computed from their values in the kth sampling instant (past values) and the current and past values of RRA_RAW and RPA_RAW. The iterative formula may be expressed as the following with properly chosen coefficients $e_0$, $e_1$, $f_0$ and $f_1$:

$$\hat{\Theta}_{x\text{-}susp}(k+1) = e_0 \Theta_{x\text{-}susp}(k) + e_1[RRA\_RAW(k+1) + RRA\_RAW(k)]$$

$$\hat{\Theta}_{y\text{-}susp}(k+1) = f_0 \Theta_{y\text{-}susp}(k) + f_1[RPA\_RAW(k+1) + RPA\_RAW(k)] \quad (5)$$

Equation (1) may be rewritten as the following $$\frac{d\theta_{wda}}{dt} = RV - \frac{d\theta_{bank}}{dt} \quad (6)$$

or $$\theta_{wda}(t) = \int_0^t RV(\tau)d\tau - \theta_{bank}(t) \quad (7)$$

where RV is calculated from the known roll velocity total and the relative roll velocity $$RV(t) = RV_{tot}(t) - \frac{d\theta_{xr}(t)}{dt} \quad (8)$$

The wheel lift status is also factored into the determination of the wheel departure angle through (7) by identifying when the integration in (7) should start and end. Assume at time instant $t_0$, one or two wheels of the vehicle start to depart from contacting the road surface (based on the wheel lifting information or any other wheel lifting indication) and before time instant to all the wheels of the vehicle are grounded. Let the road bank angle at time $t_0$ be $\theta_{b0}$, then $$0 = \int_0^{t_0} RV(\tau)d\tau - \theta_{b0} \quad (9)$$

At time instant t such that $t_0 \leq t \leq t_f$ ($t_f$ is the time instant when the lifted wheels come back to contact the road surface), (9) is subtracted from (7) to obtain the following $$\theta_{wda}(t) = \int_{t_0}^t RV(\tau)d\tau - [\theta_{bank}(t) - \theta_{b0}] \quad (10)$$

If the vehicle is on level ground then $\theta_{bank}=0$, or the vehicle is on a constant road bank (i.e., $\theta_{bank}(t)=\theta_{b0}$), then (10) is the same as $$\theta_{wda}(t) = \hat{\theta}_{wda}(t) \quad (11)$$

where the approximate or estimated $\hat{\theta}_{wda}$ is defined as the following $$\hat{\theta}_{wda}(t) = \int_{t_0}^t RV(\tau)d\tau \quad (12)$$

$\hat{\theta}_{wda}$ computed in (12) is a good approximation of the actual wheel departure angle $\theta_{wda}$ if the change in the road bank angle (delta road bank $\Delta\theta_{bank}$)

$$\Delta\theta_{bank}(t) = \theta_{bank}(t) - \theta_{b0} \quad (13)$$

is negligible with respect to $\hat{\theta}_{wda}$.

The following is a list of cases where the change in the road bank angle is zero or very low:

If the vehicle is driven on a level ground, then the delta road bank is zero and $\hat{\theta}_{wda}$ is the actual departure angle.

If the vehicle is not driven on a transient road bank, or say the vehicle is driven on a steady state bank road, then the delta road bank is close to zero and $\hat{\theta}_{wda}$ is close to the actual wheel departure angle.

If during wheel lifting, the road bank does not change much in comparison with the road bank at the initial wheel lifting time instant, then the delta road bank can be negligible and $\hat{\theta}_{wda}$ is close to the actual wheel departure angle.

If during wheel lifting the vehicle is driven very aggressive such that the roll velocity due to the road bank is much smaller than the roll velocity due to the wheel departure and the relative roll, then the delta road bank can be negligible and $\hat{\theta}_{wda}$ is close to actual wheel departure angle.

The aforementioned cases cover large portion of the scenarios where the wheel lifting could happen. Notice that since the delta road bank comes from taking away $\theta_{b0}$ from the actual road bank, and wheel lift event usually happens in seconds, the magnitude of delta road bank is relatively much smaller than the actual road bank. Therefore, if in cases where delta road bank is non-zero, its magnitude should be less than the magnitude of $\hat{\theta}_{wda}$. As shown below, a small non-zero error may not cause an adverse control effect.

First, the increased magnitude of delta road bank case is considered, i.e., the magnitude of the road bank is greater than the magnitude of the road bank at the time of entering wheel lifting. Since increased magnitude of the road bank helps stabilize the vehicle for on-camber driving (FIGS. 3a, 3c), hence less likely the control will be needed. While for off-camber driving (FIGS. 3B and 3D), increased magnitude of road bank will worsen the stability of the vehicle and it needs special control attention. Assume the vehicle is turning left. In this case, $\Delta\theta_{bank}>0$, and the actual wheel departure angle $\theta_{wda}$ is positive. Therefore, $$\theta_{wda} - \hat{\theta}_{wda} = -\Delta\theta_{bank} < 0 \qquad (14)$$

or say the magnitude of the calculated wheel departure angle $\hat{\theta}_{wda}$ is greater than the actual wheel departure angle. This means the error due to delta road bank in this case will generate an over-estimated wheel departure angle, which generates an over-control command and helps control. Hence the error does not have an adverse effect. In a right turn, $\Delta\theta_{bank}<0$, and the actual wheel departure angle $\theta_{wda}$ is negative. Therefore, $$\theta_{wda} - \hat{\theta}_{wda} = -\Delta\theta_{bank} > 0 \qquad (15)$$

or say the magnitude of the calculated wheel departure angle $\hat{\theta}_{wda}$ is greater than the actual wheel departure angle. Hence, the error does not have an adverse effect.

When the magnitude of the road bank is decreasing, i.e., the magnitude of the road bank is less than the magnitude of the road bank at the time of entering wheel lifting. Since decreased magnitude of road bank helps stabilize the vehicle for off-camber driving, control is less likely to be needed. While for on-camber driving, decreased magnitude of road bank will worsen the stability of the vehicle and control is needed. Assume the vehicle is turning left. In this case, $\Delta\theta_{bank}>0$, and the actual wheel departure angle $\theta_{wda}$ is positive. Therefore (14) is true, i.e., the magnitude of the calculated wheel departure angle $\hat{\theta}_{wda}$ is greater than the actual wheel departure angle. Hence the error does not have adverse effect. Assume the vehicle is turning right. In this case, $\Delta\theta_{bank}<0$, and the actual wheel departure angle $\theta_{wda}$ is negative. Therefore (15) is true, i.e., the magnitude of the calculated wheel departure angle $\hat{\theta}_{wda}$ is greater than the actual wheel departure angle. Hence the error does not have adverse effect.

In summary, the error due to small magnitude of the delta road bank in the computation of wheel departure angle using (12) does not reduce control effort when the control is most likely needed.

A more accurate implementation of equation (12) thus identifies the time in which the wheels lift at $t_0$ and the time in which the wheels are no longer lifted, time instant $t_f$, or say the conditions where the wheel lifting can be detected in steps 88 and 90. That is, (12) may be theoretically implemented as in step 92 as in the following:

```
if (θxr ≥ 0 & &(Swld(0) = ABSOLUTELY_LIFTED || Swld (2) =
ABSOLUTELY_LIFTED))
    || (θxr < 0 & &(Swld(1) = ABSOLUTELY_LIFTED || Swld (3) =
    ABSOLUTELY_LIFTED)))
{
    θwda = θwda + RV * p_LOOP_TIME_SEC;
}
else
{
    θwda = 0;
}
```

In the above, the wheel departure angle is determined when the relative roll angle is greater than or equal to 0 and the left side wheel (0) and (2) are absolutely lifted or the relative roll angle is less than zero and the right side wheels are absolutely lifted.

Considering the current wheel lift status $S_{wld}(i)$s for i=0, 1, 2, 3 sometimes have delays, the above computation may end up with an under-estimated $\theta_{wda}$ due to the fact that integration is delayed. Therefore, there is a need to extend the absolutely lifted condition beyond the time set by the wheel lifting status by a predetermined time in step 94. The predetermined times are determined by the thresholds. The following flag is used to extend wheel lifting condition to include conditions involving relative roll angle and the past value of the wheel departure angle.

```
WHEEL_LIFTING_CONDITION
    = || | θxr |≥ Θ1
    || (| θxr |≥ Θ2 & & | θwda |≥ ψ2)
    || (| θxr |≥ Θ3 & & | θwda |≥ ψ3)
    || (θxr ≥ 0 & &(Swld (0) = ABSOLUTELY_LIFTED || Swld (2) =
    ABSOLUTELY_LIFTED))
    || (θxr < 0 & &(Swld (1) = ABSOLUTELY_LIFTED || Swld (3) =
    ABSOLUTELY_LIFTED)))
```

Consider the fact that during an aggressive maneuver which activates the pre-charge control, the wheel lifting is likely to happen, further time extension of the wheel lifting condition is needed

```
TRANSITION_WHEEL_LIFTING_CONDITION
    = (Stransition (1) = = 1 & & θxr ≥ Θtransition-active)
    || (Stransition (0) = = 1 & & θxr < Θtransition-active)
```

On the other hand, the pure integration here might introduce numerical error, hence the pure integration is replaced by the following high-pass-filtered integration $$\theta_{wda\text{-}int} = \alpha * \theta_{wda\text{-}int} + RV * \Delta T \qquad (16)$$

where $\Delta T$ is the loop time used in the ECU.

Notice that the wheel departure angle is assumed to be in the same trend as the relative roll angle. In order to achieve this, the sign enforcement and a numerical limitation are implemented as in the following:

if $\theta_{xr} \geq 0$ $\theta_{wda\text{-}int} = \min(\Psi_{max}, \max(\theta_{wda\text{-}int}, 0));$ else $\theta_{wda\text{-}int} = \max(\Psi_{min}, \min(\theta_{wda\text{-}int}, 0));$ When the wheel lifting conditions are not met, or the vehicle potentially does not have any lifted wheels and is beyond the time described above, the integration will be terminated in step 96, i.e., the wheel departure angle computation will be terminated through the following

```
if ((WHEEL_LIFTING_CONDITION == 1
    || TRANSITION_WHEEL_LIFTING_CONDITION == 1))
{
    if (θ_xr > 0)
    { if (S_wld [0] == ABSOLUTELY_GROUNDED
        & & S_wld [2] == ABSOLUTELY_GROUNDED)
        θ_wda-int = 0; }
    else
    { if (S_wld [1] == ABSOLUTELY_GROUNDED
        & & S_wld [3] == ABSOLUTELY_GROUNDED)
        θ_wda-int = 0; }
    θ_wda = θ_wda-int ;
}
else
{
    θ_wda-int = 0;
    θ_wda = θ_wda / ρ;
}
```

The following is a detailed implementation of the afore-mentioned algorithm to compute the wheel departure angle $\theta_{wda}$.

```
θ̇_xr = (θ_xr − θ_xr-past / ΔT;
    if ( (S_transition (1) == 1 & & θ_xr ≥ Θ_transition-active)
        || (S_transition (0) == 1 & & θ_xr < −Θ_transition-active)
        ||| θ_xr |≥ Θ_1
        || (| θ_xr |≥ Θ_2 & & | θ_wda |≥ ψ_2)
        || (| θ_xr |≥ Θ_3 & & | θ_wda |≥ ψ_3))
        || (θ_xr > 0 & &(S_wld (0) = ABSOLUTELY_LIFTED || S_wld (2)
        = ABSOLUTELY_LIFTED))
        || (θ_xr > 0 & &(S_wld (1) = ABSOLUTELY_LIFTED || S_wld (3)
        = ABSOLUTELY_LIFTED)))
    {
        θ_wda-int = α* θ_wda-int + RV * ΔT;
        if (θ_xr > 0)
        {
            θ_wda-int = min(Θ_max,max(θ_wda-int,0));
            if (S_wld[0] == ABSOLUTELY_GROUNDED
                & & S_wld[2] == ABSOLUTELY_GROUNDED)
                θ_wda-int = 0;
        }
        else
        {
            θ_wda-int = max(Θ_min,min(θ_wda-int,0));
            if (S_wld[1] == ABSOLUTELY_GROUNDED
                & & S_wld[3] == ABSOLUTELY_GROUNDED)
                θ_wda-int = 0;
        }
        θ_wda = θ_wda-int ;
    }
    else
    {
        θ_wda-int = 0;
        θ_wda = θ_wda / ρ;
    }
```

Thus, as can be seen, the various threshold conditions must be met before determining the wheel departure angle from (16) If the conditions are not met $\theta_{wda}$ is set to 0.

Figure 7:
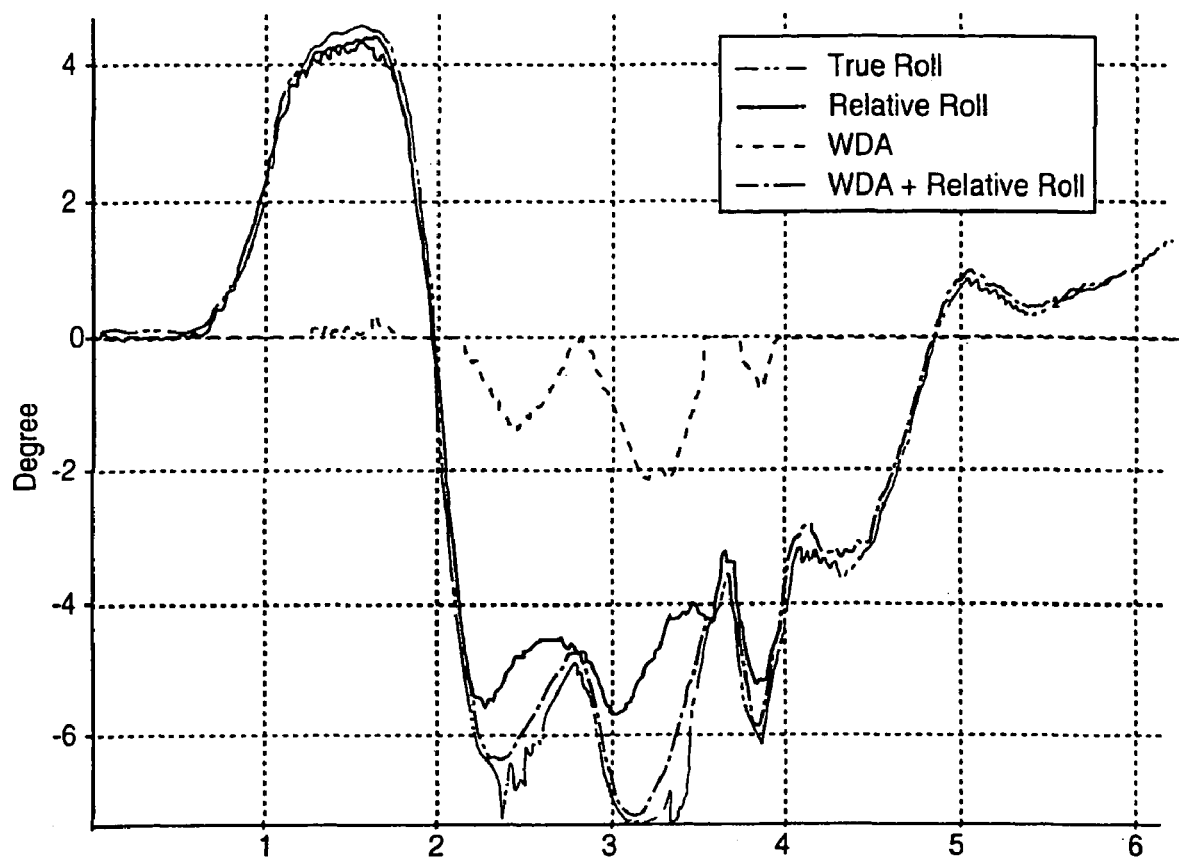
FIG. 7 is a plot of true roll angle, relative roll angle, wheel departure angle, and relative roll angle plus wheel departure angle.

Referring now to FIG. 7, a comparison between the true body roll angle (from a laser sensor) and the calculated roll angle by adding the wheel departure angle to the relative roll angle was performed in a vehicle. The laser sensor was used in a test to confirm the results set forth herein. A laser sensor is expensive and is not used in production. As can be seen, the true roll and the $\theta_{wda}$ plus relative roll angle are nearly equal. This indicates that the calculated wheel departure angle $\theta_{wda}$ does fill the gap between the vehicle true roll angle and the calculated relative roll angle $\theta_{xr}$ during potential rollover event.

The above computation focuses on obtaining a good (maybe overestimated) quantity to characterize WDA when the control is needed. Hence it might be possible during a transition from a non-event case to an event case, the computation generates a WDA which could trigger unnecessary control. On the other hand, the sensor signals are measured in the sensor frames and the sensor cluster frames are likely different from the vehicle body-fixed frames due to the sensor mounting errors (current sensor mounting errors could be around 3 degrees. Also if there is an uneven loading between front and rear axle (for example, a SUV could have a large loading in its trunk), the vehicle might have a slight pitch towards the rear of the vehicle. Such a pitch is called a loading-induced pitch misalignment (LPM). Due to LPM, the roll rate sensor will generate a non-zero output during vehicle yawing even if the vehicle body doesn't roll at all. Hence such a vehicle loading-induced pitch misalignment could introduce errors in the computation of the wheel departure angle. It would be desirable to provide further improvement over the afore-mentioned WDA computation algorithm.

In this embodiment, instead of simply assuming conditions on the delta road bank, a further detail of the road bank velocity using road roll rate is considered together with afore-mentioned error sources. In this way the potential errors in WDA computation could be further reduced. More specifically, how to detect loading-induced pitch misalignment and how to take into account of the road roll rate is described. Although both are described, one or both may be implemented. More specifically, how to use those variables to compensate potential errors in the computation of wheel departure angle is considered.

Figure 8:
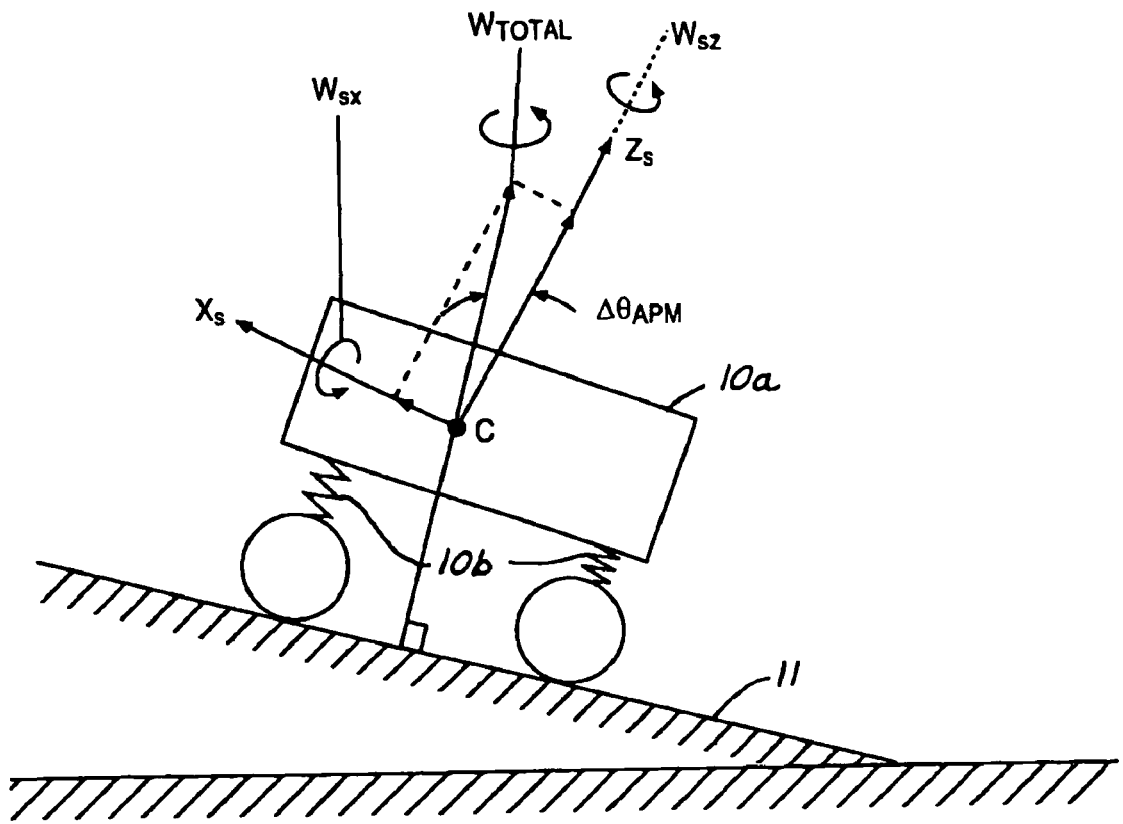
FIG. 8 is a side view of a vehicle driven on a flat but tilted road surface with indications of various angular rates experienced by the vehicle.

Consider the coordinate systems shown in FIG. 8 and FIG. 9. $y_s$-c-$z_s$ and $x_s$-c-$z_s$ formulate the sensor coordinate system on which the sensors are fixed. For example, the roll rate sensor output is along the $x_s$ direction. $y_b$-c-$z_b$ and $x_b$-c-$z_b$ formulate the vehicle body-fixed coordinate system. The relative Euler roll and pitch angles, denoted as $\theta_{s2bx}$ and $\theta_{s2by}$, between the sensor frame and the body frame are called the sensor misalignments. The static loading-induced pitch misalignment is denoted as $\theta_{LPM}$.

The vehicle body Euler roll angle (with respect to the sea level, is also called global roll angle) $\theta_{bx}$ satisfies the following $$\dot{\theta}_{bx} = \omega_{bx} + \omega_{bz}\theta_{by} \quad (17)$$

where $\omega_{bx}$ and $\omega_{bz}$ are the roll and yaw angular rates of the vehicle body along the body-fixed $x_b$ and $z_b$ axes, $\theta_{by}$ is the vehicle body Euler pitch angles with respect to the sea level.

A similar equation holds for the moving road frames $r_1r_2r_3$, i.e., the Euler angles of the average road surface (moving with the vehicle body) with respect to the sea level $$\dot{\theta}_{bank} = \omega_{roadx} + \omega_{roadz}\theta_{slope} \quad (18)$$

where $\omega_{roadx}$ and $\omega_{roadz}$ are the roll and yaw angular rates of the moving road frames $r_1r_2r_3$, which are fixed on the average of the road surface that is translating and yawing with the vehicle, $\theta_{bank}$ and $\theta_{slope}$ are the Euler angles between the moving road frame and the sea level, which reflect the road bank and the road inclination respectively.

By differentiating the vehicle body frame from the senor frame, the wheel departure angle can be rewritten as the following in contrast to (1)

$$\theta_{wda} = \theta_{bx} - \theta_{xr} - \theta_{bank} \quad (19)$$

where $\theta_{xr}$ is the roll angle between the wheel axle and the vehicle body, or say it is the dynamics induced suspension roll angle which is calculated in (3).

Since the available signals are from the sensor signals, the above body frame quantities need to be expressed from the sensor frame variables. Denote as $\Delta\theta_{s2bx}, \Delta\theta_{s2by}$ the misalignment angles between the sensor frame and the body frame, the following is true $$\theta_{bx} = \theta_{sx} - \Delta\theta_{s2bx}$$

$$\theta_{by} = \theta_{sy} - \Delta\theta_{s2by} \quad (20)$$

where $\theta_{sx}$ and $\theta_{sy}$ are the roll and pitch angles of the senor frame with respect to the sea level. $\Delta\theta_{s2bx}, \Delta\theta_{s2by}$ are usually constant, hence their time derivatives must be zero. Therefore by differentiating (20), it is not hard to derive that $$\dot{\theta}_{bx} = \dot{\theta}_{sx} \quad (21)$$

Hence the wheel departure angle velocity is not affected by the sensor roll misalignment but it is affected by the pitch misalignment as described below.

In the sensor frame the following equation similar to (17) and (18) is true $$\dot{\theta}_{sx} = \omega_{sx} + \omega_{sz}\theta_{sy} \quad (22)$$

Notice that, the vehicle body global pitch angle $\theta_{sy}$ includes the Euler pitch angle of the moving road frame, the dynamics induced relative pitch angle $\theta_{yr}$, the sensor pitch misalignment $\Delta\theta_{s2by}$ and the loading-induced pitch misalignment $\theta_{LPM}$, i.e., $$\theta_{sy} = \theta_{slope} + \theta_{yr} + \Delta\theta_{s2by} + \theta_{LPM} \quad (23)$$

Notice also that in the rollover event, it is assumed that pitchover does not happen and that the front two-wheels have not lifted or that the rear two-wheels have not lifted. Hence there is no analog of wheel departure for the pitch motion. This is true for rollover control since the majority of the vehicle motion energy is directed to the roll direction.

By using (18), (19), (21) and (22), the velocity of the wheel departure angle can be expressed as functions of the sensor frame angular rates, the road frame angular rates, the sensor frame pitch angle and the road inclination slope as $$\dot{\theta}_{wda} = (\omega_{sx} - \omega_{roadx}) + \omega_{sz}\theta_{sy} - \omega_{roadz}\theta_{slope} - \dot{\theta}_{xr} \quad (24)$$

Consider that the sensor yaw rate and the moving road roll rate are related through the involved sensor misalignment, the suspension induced relative pitch angle $\theta_{yr}$ and the loading induced pitch misalignment angle and during roll stability control WDA is kept not exceeding a limit (for example, less than 10 degree), hence we have $$\omega_{roadz} \approx \omega_{sz}\cos(\theta_{LPM} + \Delta\theta_{s2by} + \theta_{yr}) + \omega_{sx}\sin(\theta_{LPM} + \Delta\theta_{s2by} + \theta_{yr}) \quad (25)$$

(24) can be further written as in the following $$\dot{\theta}_{wda} \approx (\omega_{sx} - \omega_{roadx}) - \dot{\theta}_{xr} + \omega_{sz}(\theta_{sy} - \theta_{slope}) - \omega_{sx}\sin(\theta_{LPM} + \Delta\theta_{s2by} + \theta_{yr})\theta_{slope} \quad (26)$$

During a rollover event, the pitch motion is the secondary motion, i.e., the majority of the motion energy is directed to the roll motion. Also notice that the pitch rate is usually small hence the term $\omega_{sx}\sin(\theta_{LPM} + \Delta\theta_{s2by} + \theta_{yr})\theta_{slope}$ is small in comparison with the other terms in (26). Thus, the following simplification for the wheel departure angle velocity may be derived $$\dot{\theta}_{wda} \approx (\omega_{sx} - \omega_{roadx}) + \omega_{sz}(\theta_{LPM} + \Delta\theta_{s2by} + \theta_{yr}) - \dot{\theta}_{xr} \quad (27)$$

In summary, (27) implies that the following variables directly affect the computation of the wheel departure angle velocity:

The sensor roll angular rate $\omega_{sx}$;
The road roll angular rate $\omega_{roadx}$; The sensor yaw rate $\omega_{sz}$;
The relative roll angle $\theta_{xy}$ (suspension induced roll angle);
The relative pitch angle $\theta_{yr}$ (suspension induced pitch angle);
The sensor pitch misalignment $\theta_{LPM}$.

Notice that the sensor frame pitch and the road slope do not appear in the above format of computation of the wheel departure angle velocity while in the old methods, it is fair to say that the newly introduced road roll rate includes the pitch influence. One explanation is that the current method takes advantage of the relative concept in pitch portion instead of using the relative concept in the roll portion. The involved global quantities in the current method are the sensor roll rate and the road roll rate. Also notice that due to the relative feature of the wheel departure angle, WDA is not affected by the roll sensor misalignment $\Delta\theta_{s2bx}$.

Consider two cases of known road roll rate. The first is the one, where the vehicle is driven on a flat road which could be tilted with a tilt angle $\Psi$. Assume the vehicle is turning constantly on this tilted flat road surface, it is not hard to compute the road bank angle and the road slope angle experienced by the vehicle $$\theta_{bank} = \Psi\cos(\omega_{roadz}t + \theta_0)$$

$$\theta_{slope} = -\Psi\sin(\omega_{roadz}t + \theta_0) \quad (28)$$

where $\theta_0$ reflects the initial road bank and slope angles experienced by the vehicle. Based on (28), the road roll rate can be readily solved as $$\omega_{roadx} = \dot{\theta}_{bank} - \omega_{roadz}\theta_{slope} = 0 \quad (29)$$

Therefore, if a vehicle is driven on a flat road regardless a tilted or a level ground, the WDA velocity can be readily calculated as the following $$\dot{\theta}_{wda} \approx \omega_{sx} + \omega_{sz}(\theta_{LPM} + \Delta\theta_{s2by} + \theta_{yr}) - \dot{\theta}_{xr} \quad (30)$$

However, the road slope would have significant influence in WDA velocity in other cases. One of such cases is when the vehicle is driven on a spiral road surface (such as a parking garage), where the road bank is close to zero and the road slope is constant. In such a case, the road roll rate is non-zero even if the road bank angle and its velocity are zero $$\omega_{roadx} = \dot{\theta}_{bank} - \omega_{roadz}\theta_{slope} = -\omega_{roadz}\theta_{slope}. \quad (31)$$

Equation (31) also implies that in a spiral road driving, even though the vehicle does not have roll motion at all, the roll rate sensor has non-zero output. In such case, the WDA velocity might be readily calculated as $$\dot{\theta}_{wda} \approx \omega_{sx} - \omega_{roadx} + \omega_{sz}(\theta_{LPM} + \Delta\theta_{s2by} + \theta_{yr}) - \dot{\theta}_{xr} \quad (32)$$

$$\approx \omega_{sx} + \omega_{sz}(\theta_{LPM} + \Delta\theta_{s2by} + \theta_{yr} + \theta_{slope}) - \dot{\theta}_{xr}$$

$$= \omega_{sx} + \omega_{sz}\theta_{sy} - \dot{\theta}_{xr}$$

A similar case is when the vehicle is turning on a constant bank road, even the road doesn't have any pitch, a pitch rate sensor fixed on the road frame has non-zero output. This simple observation might well be used to justify why angle information cannot be simply obtained from integrating a corresponding angular rate signal.

The ordinary road is going to be in between a pure spiral road (constant slope and zero bank) and a tilted flat road. Hence the road roll rate should have a value in between the road roll rates corresponding to the above two extreme cases.

In the following, pitch misalignment computation will be provided. Such a ditch misalignment includes both the loading-induced pitch misalignment $\theta_{LPM}$ and the sensor mounting misalignment $\Delta\theta_{s2by}$, this is called the augmented pitch misalignment and denote it as $\Delta\theta_{PM}$ $$\Delta\theta_{APM} = \theta_{LPM} + \Delta\theta_{s2by} \quad (33)$$

Referring now to FIG. 10, the various sensor inputs are calculated in step 100. First, the detection of the pitch misalignment is determined in step 102. The different pitch angles involved are depicted in FIG. 8. If a moving vehicle is driven with constant yaw rate on a flat road, the total vehicle angular rate vector $\omega_{total}$ must be perpendicular to the road surface regardless of the road bank and road inclination. If there is no augmented pitch misalignment, i.e., $\Delta\theta_{APM}=0$, then the yaw rate sensor output $\omega_{sz}$ coincides with the total vehicle angular rate vector $\omega_{total}$ and the roll angular rate sensor output must be zero. If the augmented pitch misalignment is non-zero, then both the roll angular rate and yaw rate sensor outputs have non-zero outputs. Further, the total angular rate vector must have the magnitude of the square roots of the square sum of the roll rate and yaw rate, i.e.

$$\omega_{total} = \sqrt{\omega_{sx}^2 + \omega_{sz}^2} \quad (34)$$

Therefore, as shown in FIG. 10, the augmented pitch misalignment can be computed as $$\Delta\theta_{APM} = \sin^{-1}\left(\frac{\omega_{sx}}{\omega_{total}}\right) \quad (35)$$

If the vehicle is not driven on a flat surface, for example, if the vehicle is driven on a spiral road such as a parking garage, the road pitch would be included in the computation in (35). In this case, the above computation would generate an erroneous pitch misalignment. Hence the spiral driving condition needs to be excluded from (35).

Notice that (35) is meaningful when the vehicle is in a steady state yawing motion, the vehicle does not have large maneuver-induced roll and pitch (namely, the relative roll and pitch as calculated in Ford patent, U.S. Pat. No. 6,556, 908), which is incorporated by reference herein. In order to provide a further robust estimation, an average algorithm will be used as in the following START
if k<N && (vehicle is in steady state yawing and the road is flat)

$$\Delta\overline{\theta}_{APM_{k+1}} = \Delta\overline{\theta}_{APM_k} + \frac{\Delta\theta_{APM_{k+1}}}{N}$$

k=k+1
else if k=N
k=0
send out augmented pitch misalignment
go to START

Notice that steady state driving on a flat road can be monitored based on sensor signals, the instantaneous computation in (35) and the following calculated variables together with other control status $$\theta_{xinst} = \sin^{-1}\left\{\frac{a_{sy} - \omega_{sz}v_x - \dot{v}_{ybm}}{g}\right\} \quad (36)$$

$$\theta_{yinst} = \sin^{-1}\left\{\frac{\dot{v}_x - a_{sy} - \omega_{sz}v_{ybm}}{g}\right\}$$

where $v_{ybm}$ is the lateral velocity based on the side slip angle calculated from a linear bicycle model using steering wheel angle, yaw rate and lateral acceleration.

Using the above-calculated augmented pitch misalignment, the sensor outputs in step 104 may be compensated as in the following $$\omega_{xc} = \omega_{sx}\cos(\Delta\theta_{APM}) - \omega_{sz}\sin(\Delta\theta_{APM})$$

$$\omega_{zc} = \omega_{sx}\sin(\Delta\theta_{APM}) + \omega_{sz}\cos(\Delta\theta_{APM})$$

$$a_{xc} = a_{sx}\cos(\Delta\theta_{APM})$$

$$a_{yc} = a_{sy} \quad (37)$$

The computation of the road roll rate is determined in step 106. If the vehicle is driven on a flat surface, which could be a level ground or a tilted ground, regardless if it is a dynamic or a steady state driving condition, then the road angular rate must always be set to zero and WDA velocity should satisfy the following $$\omega_{roadx} = 0$$

$$\dot{\theta}_{wda} = \omega_{sx} + \omega_{sz}(\Delta\theta_{APM} + \theta_{yr}) - \dot{\theta}_{xr} \quad (38)$$

If the vehicle is driven on a non-flat surface in a steady state turning condition, then the road roll rate and WDA velocity should satisfy the following $$\omega_{roadx} = -\omega_{sz}(\theta_{yinst} - \Delta\theta_{APM} - \theta_{yr})$$

$$\dot{\theta}_{wda} = \omega_{sx} + \omega_{sz}\theta_{yinst} - \dot{\theta}_{xr} \quad (39)$$

If the vehicle is driven on a non-flat surface in a dynamic turning condition, then the road roll rate needs to be adjusted as in the following if ($\omega_{roadx} > 0$)

$$\omega_{roadx} = \omega_{roadx} - r_{down};$$

if ($\omega_{roadx} \leq 0$)

$$\omega_{roadx} = \omega_{roadx} + r_{down};$$

$$\dot{\theta}_{wda} = \omega_{sx} - \omega_{roadx} + \omega_{sz}(\theta_{APM} + \theta_{yr}) - \dot{\theta}_{xr} \quad (40)$$

If the vehicle is driven on dynamic roll condition with wheel lifting, then the vehicle is in a potential rollover event. In most of the cases, all the vehicle motion energy is directed to the roll direction, the vehicle could be thought as driven on a flat surface $$\omega_{roadx} = 0$$

$$\dot{\theta}_{wda} \approx \omega_{sx} + \omega_{sz}(\Delta\theta_{APM} + \theta_{yr}) - \dot{\theta}_{xr} \quad (41)$$

In implementation, the wheel lifting state is determined in step 108 as described above. Thus, the following is conducted if (there is 1 AL)

if ($\omega_{roadx} > 0$)

$\omega_{roadx} = \omega_{roadx} - r_{down}$;

if ($\omega_{roadx} \leq 0$)

$\omega_{roadx} = \omega_{roadx} - r_{down}$;

else if (there are 2 AL)

$\omega_{roadx} = 0$;

else if (transition from 2 AL to 1 AL)

if ($\omega_{roadx} > 0 \&\& \omega_{roadx} < \omega_{sx}$)

$\omega_{roadx} = \omega_{roadx} - r_{up}$;

if ($\omega_{roadx} \leq 0 \&\& \omega_{roadx} \geq \omega_{sx}$)

$\omega_{roadx} = \omega_{roadx} - r_{up}$;

else if (transition from 1 AL to 0 AL or AG condition)

$\omega_{roadx} = \omega_{roadx} + (\omega_{roadx} - \omega_{sx})/\rho$;

Where $r_{down}$ and $r_{up}$ are a ramping down rate and a ramping up rate for the road roll rate. $\rho$ is a positive number greater than 1. AL denotes absolutely lifted condition identified from the wheel lift detection algorithms and AG denotes the absolutely grounded condition identified from the wheel lift detection algorithm.

Thus, because the augmented pitch alignment and road roll rate, the wheel departure angle may be determined in step 110 by using equation (34). The road roll rate takes into consideration the ramping up and down rates as well as the lifting conditions of the wheel.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling an automotive vehicle comprising:
determining a road roll rate;
determining a wheel departure angle in response to the road roll rate; and controlling the vehicle in response to the wheel departure angle.

2. A method as recited in claim 1 further comprising determining a relative roll angle; and
wherein controlling the vehicle comprises controlling the vehicle in response road roll rate and a load-induced pitch misalignment.

3. A method as recited in claim 2 wherein determining a relative roll angle comprises determining a relative roll angle in response to a roll rate and a lateral acceleration.

4. A method as recited in claim 2 wherein determining a wheel departure angle comprises determining the wheel departure angle in response to the road roll rate, a yaw rate, the relative roll angle, the relative pitch angle, and the sensor pitch misalignment.

5. A method as recited in claim 4 wherein determining a road roll rate is performed when the relative roll angle is within a first predetermined threshold and the wheel departure angle is within a second predetermined threshold.

6. A method as recited in claim 5 wherein the first predetermined threshold and second predetermined threshold are a function of a roll gradient.

7. A method as recited in claim 1 wherein determining a road roll rate comprises determining the road roll rate in response to a sensor roll rate.

8. A method as recited in claim 1 wherein determining a road roll rate comprises determining the road roll rate in response to a roll rate and a yaw rate.

9. A method as recited in claim 1 wherein determining a road roll rate comprises determining the road roll rate in response to a roll rate, a yaw rate and a pitch rate.

10. A method as recited in claim 1 wherein determining a road roll rate comprises determining the road roll rate in response to a yaw rate and a pitch rate.

11. A method as recited in claim 1 wherein determining a road roll rate comprises determining the road roll rate in response to a roll rate and a previous wheel departure angle.

12. A method as recited in claim 1 wherein determining a road roll rate comprises determining the road roll rate in response to a roll rate, a previous wheel departure angle and a time constant.

13. A method as recited in claim 1 wherein determining a road roll rate is performed in response to a wheel lift status.

14. A method as recited in claim 1 wherein determining a road roll rate is performed in response to a brake precharge status.

15. A method of controlling a safety system of an automotive vehicle comprising:
determining a total roll angle velocity;
determining a wheel departure angle in response to a total roll angle velocity;
determining a relative roll angle; and
controlling the safety system in response to the wheel departure angle and the relative roll angle.

16. A method as recited in claim 15 wherein controlling the safety system comprises controlling the safety system in response to the wheel departure angle and the relative roll angle during wheel lift and for a predetermined time thereafter.

17. A method as recited in claim 15 wherein controlling the safety system comprises controlling at least one of an active brake control system, an active rear steering system, an active front steering system, an active anti-roll bar system, and an active suspension system.

18. A method as recited in claim 15 wherein determining a total roll angle velocity is performed when the relative roll angle is within a first predetermined threshold and the wheel departure angle is within a second predetermined threshold.

19. A method as recited in claim 18 wherein the first predetermined threshold and second predetermined threshold are a function of a roll gradient.

20. A method as recited in claim 15 wherein determining a total roll angle velocity comprises determining in response to a roll rate.

21. A method as recited in claim 15 wherein determining a total roll angle velocity comprises determining in response to a roll rate and a yaw rate.

22. A method as recited in claim 15 wherein determining a total roll angle velocity comprises determining in response to a roll rate, a yaw rate and a pitch rate.

23. A method as recited in claim 15 wherein determining a total roll angle velocity comprises determining in response to a yaw rate and a pitch rate.

24. A method as recited in claim 15 wherein determining a total roll angle velocity comprises determining in response to a roll rate and a previous wheel departure angle.

25. A method as recited in claim 15 wherein determining a total roll angle velocity comprises determining in response to a roil rate, a previous wheel departure angle and a time constant.

26. A method as recited in claim 15 wherein determining a total roll angle velocity is performed in response to a wheel lift status.

27. A method as recited in claim 15 wherein determining a total roll angle velocity is performed in response to a brake precharge status.

28. A control system comprising:
   a roll rate sensor generating a roll rate signal;
   a lateral acceleration sensor generating a lateral acceleration signal;
   a yaw rate sensor generating a yaw rate signal; and
   a controller coupled to the roll rate sensor, the lateral acceleration sensors, and the yaw rate sensor, said controller determining a total roil velocity total from the roll rate signal, the yaw rate signal and a pitch rate signal, said controller determining a relative roil angle from the roll rate signal and the lateral acceleration signal, said controller determining a wheel departure angle from the total roll velocity, said controller determining a calculated roll signal from the wheel departure angle and the relative roll angle signal.

29. A control system as recited in claim 28 further comprising a longitudinal acceleration sensor generating a longitudinal acceleration signal, said controller determining the total roll velocity as a function of the longitudinal acceleration signal.

30. A control system as recited in claim 29 wherein said controller determines a calculated pitch rate as a function of the longitudinal accelerator, said total roll velocity being a function of the calculated pitch rate.

* * * * *